US012657817B2

(12) United States Patent
Han et al.

(10) Patent No.: US 12,657,817 B2
(45) Date of Patent: Jun. 16, 2026

(54) METHOD AND APPARATUS FOR DETERMINING PERSONA OF AVATAR OBJECT IN VIRTUAL SPACE

(71) Applicant: Samsung Electronics Co., Ltd., Suwon-si (KR)

(72) Inventors: Woojung Han, Suwon-si (KR); Gajin Song, Suwon-si (KR); Hoseon Shin, Suwon-si (KR); Dongchoon Hwang, Suwon-si (KR); Kyungtae Kim, Suwon-si (KR); Kanghee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 223 days.

(21) Appl. No.: 18/492,128

(22) Filed: Oct. 23, 2023

(65) Prior Publication Data

US 2024/0087221 A1 Mar. 14, 2024

Related U.S. Application Data

(63) Continuation of application No. PCT/KR2023/012062, filed on Aug. 16, 2023.

(30) Foreign Application Priority Data

| Sep. 13, 2022 | (KR) | ........................ 10-2022-0114962 |
| Oct. 31, 2022 | (KR) | ........................ 10-2022-0142957 |

(51) Int. Cl.
*G06T 17/00* (2006.01)
*G06T 13/40* (2011.01)
(Continued)

(52) U.S. Cl.
CPC .............. *G06T 17/00* (2013.01); *G06T 13/40* (2013.01); *G06V 20/44* (2022.01); *G06V 40/20* (2022.01)

(58) Field of Classification Search
None
See application file for complete search history.

(56) References Cited

U.S. PATENT DOCUMENTS

| 2017/0080346 A1 | 3/2017 | Abbas |
| 2021/0192823 A1 | 6/2021 | Amitay et al. |

FOREIGN PATENT DOCUMENTS

| KR | 100993801 B1 | 11/2010 |
| KR | 20110014224 A | 2/2011 |

(Continued)

OTHER PUBLICATIONS

Search Report dated Nov. 23, 2023 in corresponding International Patent Application No. PCT/KR2023/012062 and English-language translation.

*Primary Examiner* — Peter Hoang
(74) *Attorney, Agent, or Firm* — Nixon & Vanderhye, P.C.

(57) ABSTRACT

An example electronic device may include a display module, a memory configured to store computer-executable instructions, and a processor configured to execute the instructions by accessing the memory. The processor may be configured to create a preliminary persona based on first information related to history of a target user, create a first persona from the preliminary persona based on second information related to a time and a space of the target user, apply the first persona to an avatar object in a virtual space and corresponding to the target user, and, when an occurrence of an event related to the target user is detected, create a second persona from the first persona based on the event occurrence and apply the second persona, instead of the first persona, to the avatar object.

20 Claims, 13 Drawing Sheets

(51) Int. Cl.
    *G06V 20/40*       (2022.01)
    *G06V 40/20*       (2022.01)

(56)            References Cited

FOREIGN PATENT DOCUMENTS

| | | |
|---|---|---|
| KR | 101872000 | 6/2018 |
| KR | 10-2020-0075256 | 6/2020 |
| KR | 20200096617 A | 8/2020 |
| KR | 20220059561 A | 5/2022 |
| KR | 20220074705 A | 6/2022 |
| KR | 102419056 B1 | 7/2022 |
| KR | 102420379 B1 | 7/2022 |
| WO | 2021/229692 | 11/2021 |

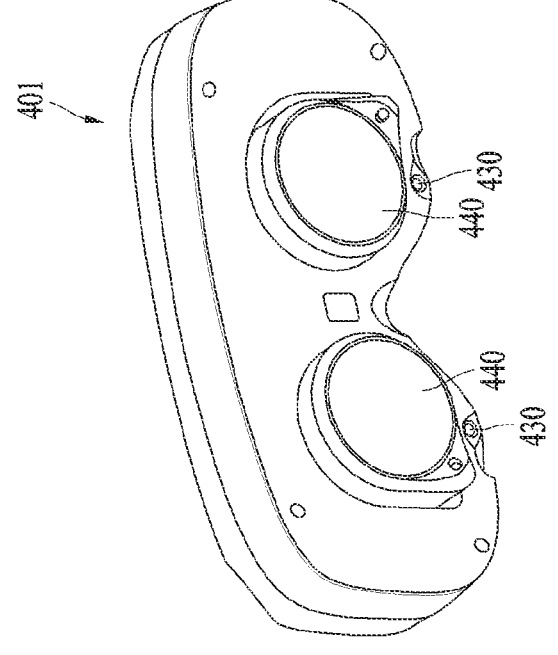
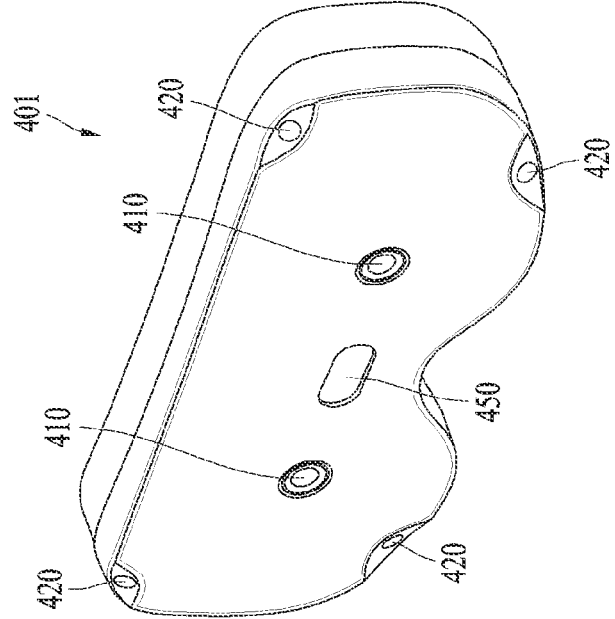
FIG. 4

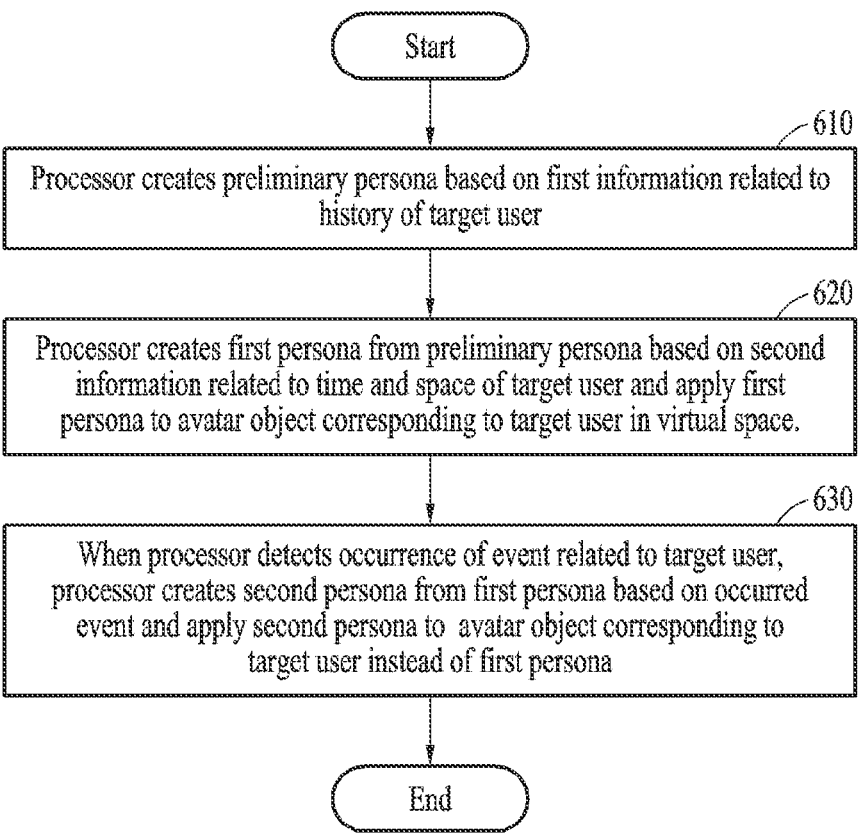

Start

610

Processor creates preliminary persona based on first information related to history of target user

620

Processor creates first persona from preliminary persona based on second information related to time and space of target user and apply first persona to avatar object corresponding to target user in virtual space.

630

When processor detects occurrence of event related to target user, processor creates second persona from first persona based on occurred event and apply second persona to avatar object corresponding to target user instead of first persona End

FIG. 6

METHOD AND APPARATUS FOR DETERMINING PERSONA OF AVATAR OBJECT IN VIRTUAL SPACE

CROSS-REFERENCE TO RELATED APPLICATIONS

This application is a continuation application of International Application No. PCT/KR2023/012062 designating the United States, filed on Aug. 16, 2023, in the Korean Intellectual Property Receiving Office and claiming priority to Korean Patent Application No. 10-2022-0114962, filed on Sep. 13, 2022, and Korean Patent Application No. 10-2022-0142957, filed on Oct. 31, 2021, in the Korean Intellectual Property Office, the disclosures of each of which are incorporated by reference herein in their entireties.

BACKGROUND

1. Field

The disclosure relates to technology for determining the persona of an avatar object in a virtual space.

2. Description of Related Art

Virtual reality (VR), augmented reality (AR), and mixed reality (MR) technology that uses computer graphics technology has recently been advanced. Here, VR technology may, for example, establish a virtual space, which is non-existent in the real world, based on a computer and make the virtual space as if the virtual space were real. AR or MR technology may, for example, add information generated by a computer to the real world. That is, AR or MR technology may combine a virtual world with the real world, thereby enabling real-time interaction with a user.

SUMMARY

According to an example embodiment, an electronic device may include a display module (e.g., including a display), a memory configured to store computer-executable instructions, and a processor configured to execute the instructions by accessing the memory. The processor may be configured to create a preliminary persona based on first information related to history of a target user; create a first persona from the preliminary persona based on second information related to a time and a space of the target user; apply the first persona to an avatar object corresponding to the target user placed in a virtual space; and, when an occurrence of an event related to the target user is detected, create a second persona from the first persona based on the occurred event and apply the second persona to the avatar object corresponding to the target user instead of the first persona.

According to an example embodiment, a method (e.g., performed by a processor) may include creating a preliminary persona based on first information related to history of a target user; creating a first persona from the preliminary persona based on second information related to a time and a space of the target user; applying the first persona to an avatar object that is placed in a virtual space and corresponding to the target user; and, when an occurrence of an event related to the target user is detected, creating a second persona from the first persona based on the occurred event and applying the second persona to the avatar object corresponding to the target user instead of the first persona.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 4 illustrates an example video see-through device according to various embodiments;

FIG. 6 is a flowchart illustrating an example process of generating a persona applied to an avatar object of a target user by an electronic device according to various embodiments;

DETAILED DESCRIPTION

Figure 1:
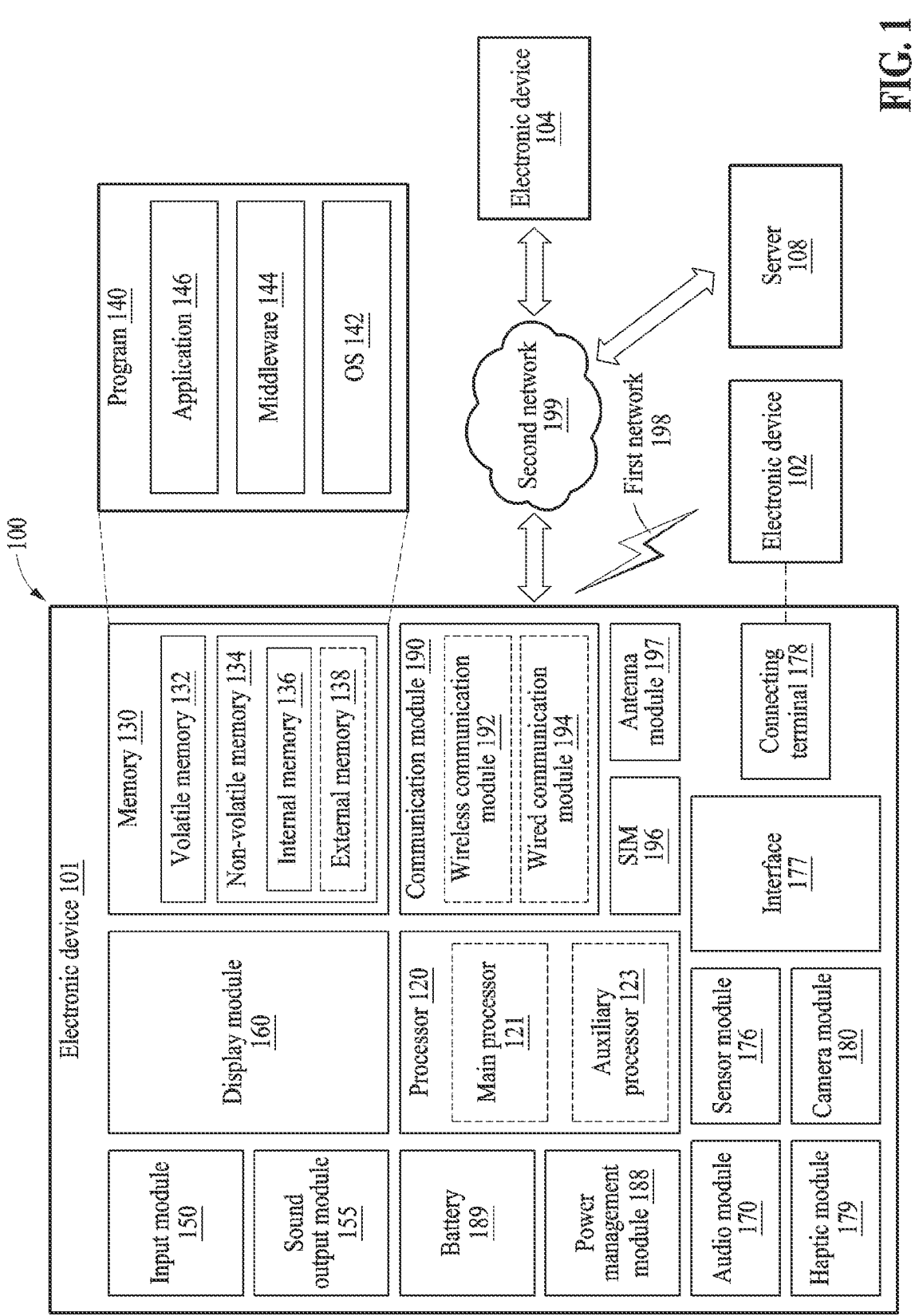
FIG. 1 is a block diagram illustrating an example configuration of an electronic device according to various embodiments.

Hereinafter, example embodiments will be described in detail with reference to the accompanying drawings. When describing the example embodiments with reference to the accompanying drawings, like reference numerals refer to like constituent elements and a repeated description related thereto will not be repeated.

FIG. 1 is a block diagram illustrating an example configuration of an electronic device according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be predetermined to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 (e.g., a display) may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199.

Each of the external electronic devices 102, 103, and 108 may be a device of the same type as or a different type from the electronic device 101. According to an embodiment, all or some of operations to be executed by the electronic device 101 may be executed at one or more external electronic devices (e.g., the external devices 102, 103, and 108). For example, if the electronic device 101 needs to perform a function or a service automatically, or in response to a request from a user or another device, the electronic device 101, instead of, or in addition to, executing the function or the service, may request one or more external electronic devices to perform at least portion of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. The present specification may mainly describe examples in which the electronic device 101 is an augmented reality (AR) device (e.g., the electronic device 201 of FIG. 2, the electronic device 301 of FIG. 3, or the electronic device 401 of FIG. 4) and a server 108 among the external electronic devices 102, 103, and server 108 transmits, to the electronic device 101, a virtual space and an additional function related to the virtual space or a result of executing a service.

A server 108 may include a processor, a communication module, and a memory. The processor, the communication module, and the memory may be configured similarly to the processor 120, the communication module 190, and the memory 130 of the electronic device 101. For example, the processor of the server may provide a virtual space and an interaction between users in the virtual space by executing a command stored in the memory of the server. The processor of the server may generate at least one of visual information, auditory information, and haptic information of a virtual space and an object in the virtual space. For example, as visual information, the processor of the server may generate rendered data (e.g., visual rendered data) obtained by rendering the appearance (e.g., a shape, a size, a color, or a texture) of the virtual space and the appearance (e.g., a shape, a size, a color, or a texture) of an object in the virtual space. In addition, the processor of the server may generate rendered data obtained by rendering a change (e.g., a change in the appearance of an object, a sound, or a tactile sensation) based on at least one of an interaction between objects (e.g., a physical object, a virtual object, or an avatar object) in a virtual space and a user's input with respect to an object (e.g., a physical object, a virtual object, or an avatar object). The communication module of the server may establish communication between a user's first electronic device (e.g., the electronic device 101) and another user's second electronic device (e.g., the electronic device 102). The communication module of the server may transmit at least one of the visual information, haptic information, and auditory information to the first electronic device and the second electronic device. For example, the communication module of the server may transmit rendered data.

For example, the server 108 may render content data executed by an application and then transmit the data to the electronic device 101. The electronic device 101 receiving the data may output the content data to the display module 160. When the electronic device 101 detects a motion of a user through an inertial measurement unit (IMU) sensor, and the like, the processor 120 of the electronic device 101 may correct the rendered data received from the server 108 based on information about the motion and may output the corrected data to the display module 160. Alternatively, the processor 181 may transmit the information about the motion to the server 108 and transmit a rendering request such that screen data is updated accordingly. However, the disclosure is not limited thereto. The rendering described above may be performed by the server 108 and various types of the external electronic devices 102 and 103, such as a case device capable of storing and charging a smartphone or the electronic device 101. Rendered data corresponding to the foregoing virtual space generated by the server 108 and/or external electronic devices 102 and 103 may be provided to the electronic device 101. In an embodiment, the electronic device 101 may receive virtual space information (e.g., vertex coordinates, a texture, and a color that define the virtual space) and object information (e.g., vertex coordinates, a texture, and a color that define the appearance of a object) from the server 108 and may autonomously perform rendering based on the received data.

Figure 2:
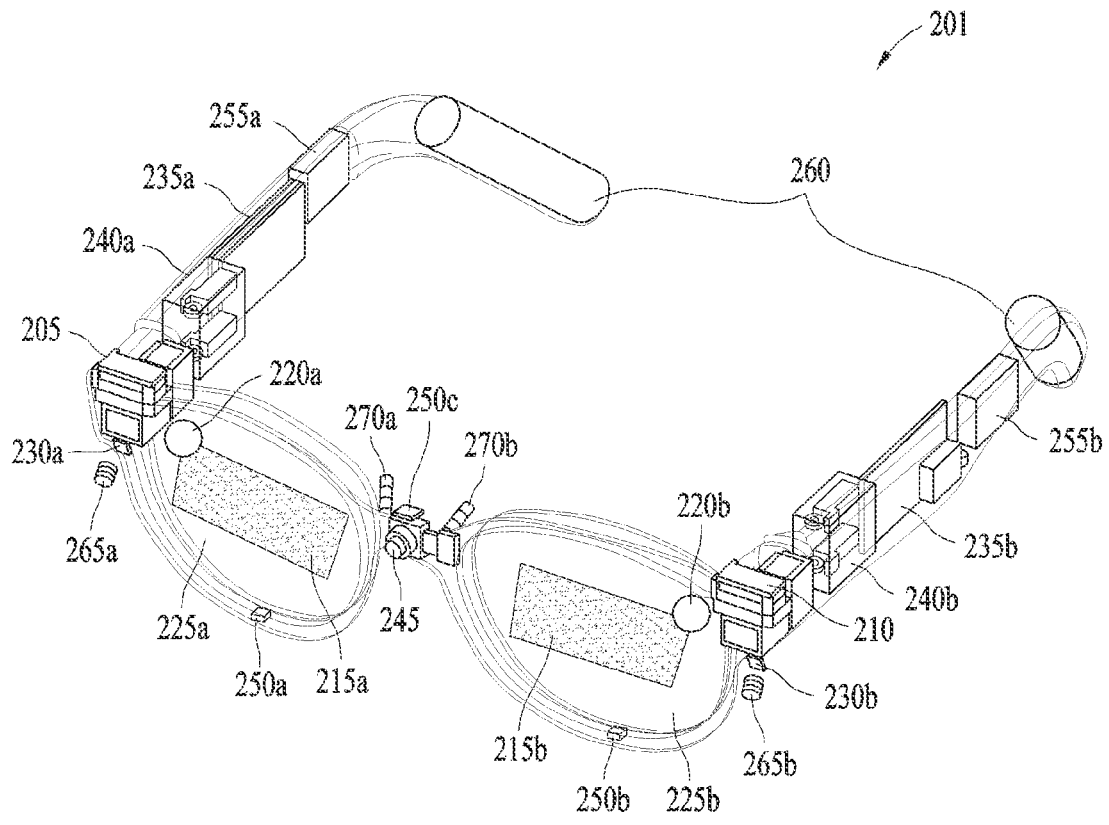
FIG. 2 is a diagram illustrating an example optical see-through device according to various embodiments.

FIG. 2 is a diagram illustrating an example optical see-through device according to various embodiments.

An electronic device 201 may include at least one of a display (e.g., the display module 160 of FIG. 1), a vision sensor, light sources 230a and 230b, an optical element, or a substrate. The electronic device 201 having a transparent display and providing an image through the transparent display may be referred to, for example, as an optical see-through (OST) device.

For example, the display may include a liquid crystal display (LCD), a digital mirror device (DMD) display, a liquid crystal on silicon (LCoS) display, an organic light-emitting diode (OLED) display, and/or a micro light-emitting diode (micro LED) display. Although not shown in the diagrams, when the display is one of an LCD, a DMD display, or an LCoS display, the electronic device 201 may include the light sources 230a and 230b configured to emit light to a screen output area (e.g., screen display portions 215a and 215b) of the display. In an embodiment, when the display is capable of autonomously generating light, for example, when the display is either an OLED or a micro-LED display, the electronic device 201 may provide a virtual image with relatively high quality to the user even though the light sources 230a and 230b are not included. For example, when the display is implemented as an OLED display or a micro-LED display, the light sources 230a and 230b may be unnecessary and accordingly, the electronic device 201 may be reduced in weight.

Referring to FIG. 2, the electronic device 201 may include a first transparent member 225a and/or a second transparent member 225b. The user may use the electronic device 201 while wearing the electronic device 201 on the user's face. The first transparent member 225a and/or the second transparent member 225b may be formed of a glass plate, a plastic plate, or polymer and may be transparently or translucently formed. According to an embodiment, the first transparent member 225a may face the right eye of the user and the second transparent member 225b may face the left eye of the user. The display may include a first display 205, which outputs a first image (e.g., a right image) corresponding to the first transparent member 225a, and a second display 210 that outputs a second image (e.g., a left image) corresponding to the second transparent member 225b. According to an embodiment, when each of the first display 205 and the second display 210 is transparent, the first display 205, the second display 210, the first transparent member 225a, and the second transparent member 225b may each face the user's eyes to configure the screen display portions 215a and 215b.

In an embodiment, light emitted from the first display 205 and the second display 210 may be guided by a waveguide through input optical members 220a and 220b. Light moving into the waveguide may be guided toward the users' eyes through an output optical member (e.g., an output optical member 340 of FIG. 3). The screen display portions 215a and 215b may be determined based on light emitted toward the user's eyes.

For example, the light emitted from the first display 205 and the second display 210 may be reflected from a grating area of the waveguide formed in the input optical members 220a and 220b and the screen display portions 215a and 215b and may be transmitted to the user's eyes.

The optical element may include at least one of a lens and an optical waveguide.

The focus of the lens may be adjusted so that the user may see a screen output on the display. The lens may include, for example, at least one of a Fresnel lens, a Pancake lens, and a multi-channel lens.

The optical waveguide may transfer image rays generated from the display to the user's eyes. For example, the image rays may, for example, refer to rays in which light emitted by the light sources 230a and 230b passes through the screen output area of the display. The optical waveguide may be made of glass, plastic, or polymer. The optical waveguide may include a nano-pattern partially formed on the inner or outer surface of the optical waveguide, for example, in a polygonal or a curved grating structure. An example structure of the optical waveguide is described below with reference to FIG. 3.

The vision sensor may include at least one of a camera sensor and a depth sensor.

First cameras 265a and 265b may be recognition cameras and may, for example, be cameras used for head tracking, hand detection, hand tracking, and spatial recognition of 3 Degrees of Freedom (DoF) and 6 DoF. The first cameras 265a and 265b may, for example, mainly include global shutter (GS) cameras. Since a stereo camera is required for head tracking and spatial recognition, the first cameras 265a and 265b may include two or more GS cameras. A GS camera may have greater performance than a rolling shutter (RS) camera in terms of detecting and tracking fine movements of quick hand gestures and fingers. For example, the GS camera may have low image blur. The first cameras 265a and 265b may capture image data used for a simultaneous localization and mapping (SLAM) function through spatial recognition and depth imaging for 6DoF. In addition, a user gesture recognition function may be performed based on image data captured by the first cameras 265a and 265b.

Second cameras 270a and 270b may be Eye Tracking (ET) cameras and may, for example, be used to capture image data for detecting and tracking the user's eyes. The second cameras 270a and 270b are described below with reference to FIG. 3.

A third camera 245 may be a photographing camera. In an embodiment, the third camera 245 may, for example, include a high-resolution camera to capture a "high resolution (HR)" image or a "photo video (PV)" image. The third camera 245 may, for example, include a color camera equipped with an auto focus (AF) function and functions for obtaining high-quality images, such as optical image stabilization (OIS). The third camera 245 may be a GS camera or an RS camera.

A fourth camera portion (e.g., a face recognition camera 430 of FIG. 4 below) may be a face recognition camera and a face tracking (FT) camera may be used to detect and track the user's facial expression.

A depth sensor (not shown) may, for example, refer to a sensor that senses information for determining the distance to an object, such as Time of Flight (ToF). ToF may, for example, refer to technology for measuring the distance of an object using signals (near infrared rays, ultrasound, laser, and the like). A depth sensor based on ToF technology may measure the ToF of a signal, where a transmitter transmits a signal and a receiver measures the signal.

The light sources 230a and 230b (e.g., an illumination module) may include elements (e.g., light-emitting diodes (LEDs)) that emit light of various wavelengths. The illumination module may attach to various positions depending on a purpose thereof. In an example, a first illumination module (e.g., an LED device) attached to the periphery of the frame of an AR glasses device may emit light for assisting gaze detection when eye movement is tracked by an ET camera. In an example embodiment, the first illumination module may include an infrared (IR) LED of an infrared wavelength. In an example embodiment, a second illumination module (e.g., an LED element) may be attached adjacent to a camera mounted around hinges 240a and 240b connecting the frame to the temple, or a camera around a bridge connecting frames. The second illumination module may, for example, emit light for supplementing ambient brightness during camera photography. When a subject is not easily detected in a dark environment, the second illumination module may emit light.

Substrates 235a and 235b (e.g., PCBs) may support components including the components described above.

A PCB may be on the temple. A flexible PCB (FPCB) may transmit electrical signals to each module or component (e.g., a camera, a display, an audio module, and a sensor module) and other PCBs. According to an embodiment, at least one PCB may include a first board, a second board, and an interposer between the first board and the second board. In an embodiment, a PCB may be in the center of a set. Electrical signals may be transmitted to each module and other PCBs through the FPCB.

Other components of the electronic device 201 may include, for example, at least one of a plurality of microphones (e.g., a first microphone 250a, a second microphone 250b, and a third microphone 250c), a plurality of speakers (e.g., a first speaker 255a and a second speaker 255b), a battery 260, an antenna, and a sensor (such as an acceleration sensor, a gyro sensor, or a touch sensor).

Figure 3:
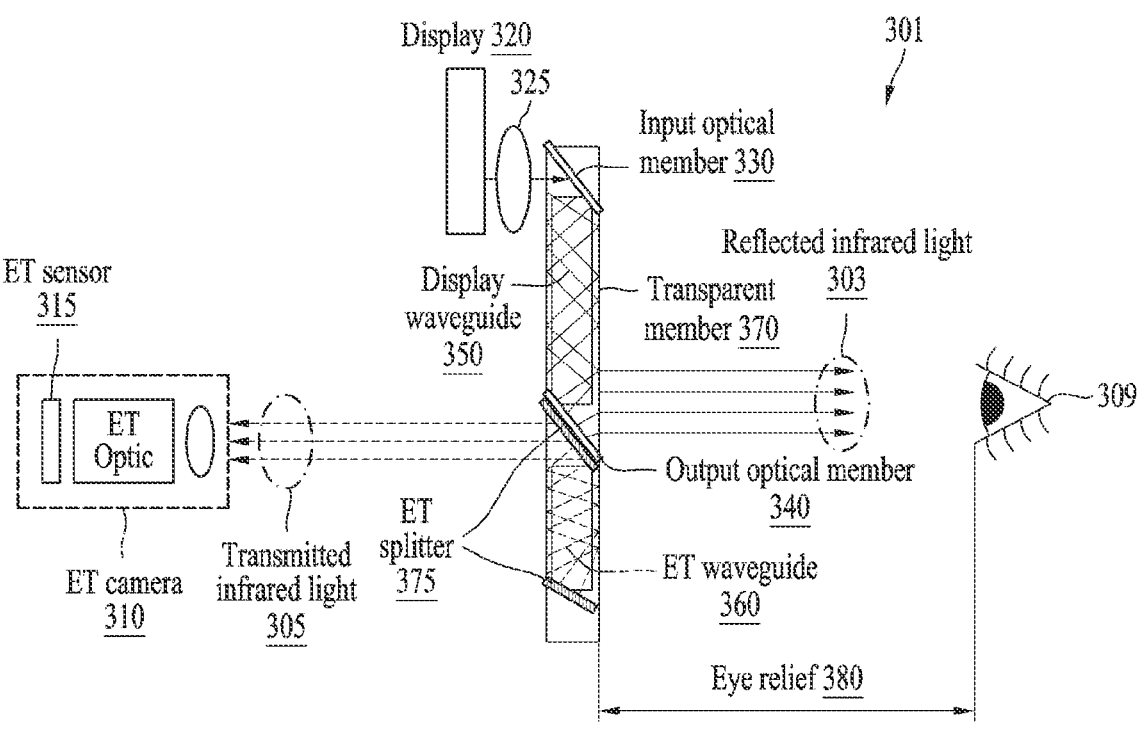
FIG. 3 illustrates an example of an optical system for an eye tracking camera, a transparent member, and a display according to various embodiments.

FIG. 3 illustrates an example of an optical system for an ET camera, a transparent member, and a display according to various embodiments.

FIG. 3 is a diagram illustrating an operation of an ET camera included in an electronic device according to various embodiments. FIG. 3 illustrates a process in which an ET camera 310 (e.g., the second cameras 270a and 270b of FIG. 2) of an electronic device 301 according to an embodiment may track an eye 309 of a user, that is, the gaze of the user, using light (e.g., IR light) output from a display 320 (e.g., the first display 205 and the second display 210 of FIG. 2).

A second camera (e.g., the second cameras 270a and 270b of FIG. 2) may be the ET camera 310 for collecting information to position the center of a virtual image projected on the electronic device 301 according to the direction stared at (gazed at) by the pupil of a person wearing the electronic device 301. The second camera may also include a GS camera to detect the pupil and track the fast movement of the pupil. The ET camera 310 may be also installed for each of the left and right eyes, and the ET cameras 310 for the left and right eyes may have the same performance and specifications. The ET camera 310 may include an ET sensor 315. The ET sensor 315 may be included inside the ET camera 310. IR light output from the display 320 may be transmitted as reflected infrared light 303 to the eye 309 of the user by a half mirror. The ET sensor 315 may detect transmitted infrared light 305 that is generated when the reflected infrared light 303 is reflected from the eye 309 of the user. The ET camera 310 may track the eye 309 of the user, that is, the gaze of the user, based on the detection result of the ET sensor 315.

The display 320 may include a plurality of visible light pixels and a plurality of IR pixels. The visible light pixels may include R, G, and B pixels. The visible light pixels may output visible light corresponding to a virtual object image. The IR pixels may output infrared light. The display 320 may include, for example, micro LED displays, or OLED displays.

A display waveguide 350 and an ET waveguide 360 may be included in a transparent member (e.g., the first transparent member 225a and the second transparent member 225b of FIG. 2). The transparent member 370 may be formed of, for example, a glass plate, a plastic plate, or polymer and may be transparently or translucently formed. The transparent member 370 may face the eye of a user. In this case, the distance between the transparent member 370 and the eye 309 of the user may be referred to as "eye relief" 380.

The transparent member 370 may include the display waveguide 350 and the ET waveguide 360. The transparent member 370 may include an input optical member 330 and an output optical member 340. In addition, the transparent member 370 may include an ET splitter 375 that splits the input light into several waveguides.

According to an embodiment, light incident to one end of the display waveguide 350 may spread inside the display waveguide 350 by a nanopattern and may be provided to the user. In addition, the display waveguide 350 including a free-form prism may provide image light to the user through a reflection mirror of incident light. The display waveguide 350 may include at least one of a reflective element (e.g., a reflection mirror) and at least one diffractive element (e.g., a diffractive optical element (DOE) or a holographic optical element (HOE)). The display waveguide 350 may guide display light (e.g., image light) emitted from a light source to the eye 309 of the user by using at least one of the diffractive element or the reflective element included in the display waveguide 350. For reference, the output optical member 340 is separated from the ET waveguide 360, as shown in FIG. 3. However, this is only an example. The output optical member 340 may also be included in the ET waveguide 360.

According to various embodiments, the diffractive element may include the input optical member 330 and the output optical member 340. For example, the input optical member 330 may, for example, refer to an input grating area. The output optical member 340 may, for example, refer to an output grating area. The input grating area may function as an input terminal which diffracts (or reflects) the light output from the display (e.g., a micro LED display) to transmit the light to transparent members (e.g., the first transparent member 250a and the second transparent member 250b). The output grating area may serve as an exit for diffracting (or reflecting), to the eye 309 of the user, the light transmitted to the transparent member (e.g., the first transparent member 250a and the second transparent member 250b) of the waveguide.

According to various embodiments, the reflective element may include a total reflection optical element or a total reflection waveguide for total internal reflection (TIR). For example, TIR, which is one scheme for guiding light, may form an angle of incidence such that light (e.g., a virtual image) entering through the input grating area is completely reflected from one surface (e.g., a specific surface) of the waveguide, to completely transmit the light to the output grating area.

In an embodiment, the light emitted from the display 320 may be guided to the waveguide through the input optical member 330. Light traveling in the waveguide may be guided toward the eyes of the user through the output optical member 340. A screen display portion may be determined based on the light emitted toward the eye 309 of the user.

FIG. 4 illustrates an example video see-through device according to various embodiments.

In FIGS. 2 and 3, the display is transparent but is not limited thereto. Referring to FIG. 4, an electronic device 401 may include a display 440, which is opaque. The electronic device 401 may generate a scene image corresponding to the field of view (FOV) of a user based on captured image data using camera sensors 410 and 420 (e.g., the first cameras 265a and 265b for photographing or the third camera 245 in FIG. 2). The electronic device 401 may output the generated scene image through the display 440, which is opaque. The electronic device 401 may provide a scene image corresponding to the left eye FOV to the user's left eye and a scene image corresponding to the right eye FOV to the user's right eye through the display 440 and an individual lens. Accordingly, the user may receive visual information corresponding to the FOV of the user through a video image provided based on the camera, the display 440, and the lens. The electronic device 401 shown in FIG. 4 may also be referred to as a Video See Through (VST) device. The electronic device 401 may include a face recognition camera 430.

For reference, in the electronic device 401 shown in FIG. 4, the arrangement of the camera sensors 410 and 420, a depth sensor 450, the display 440, or the lens is merely an example and the disclosure is not limited in this respect.

Figure 5:
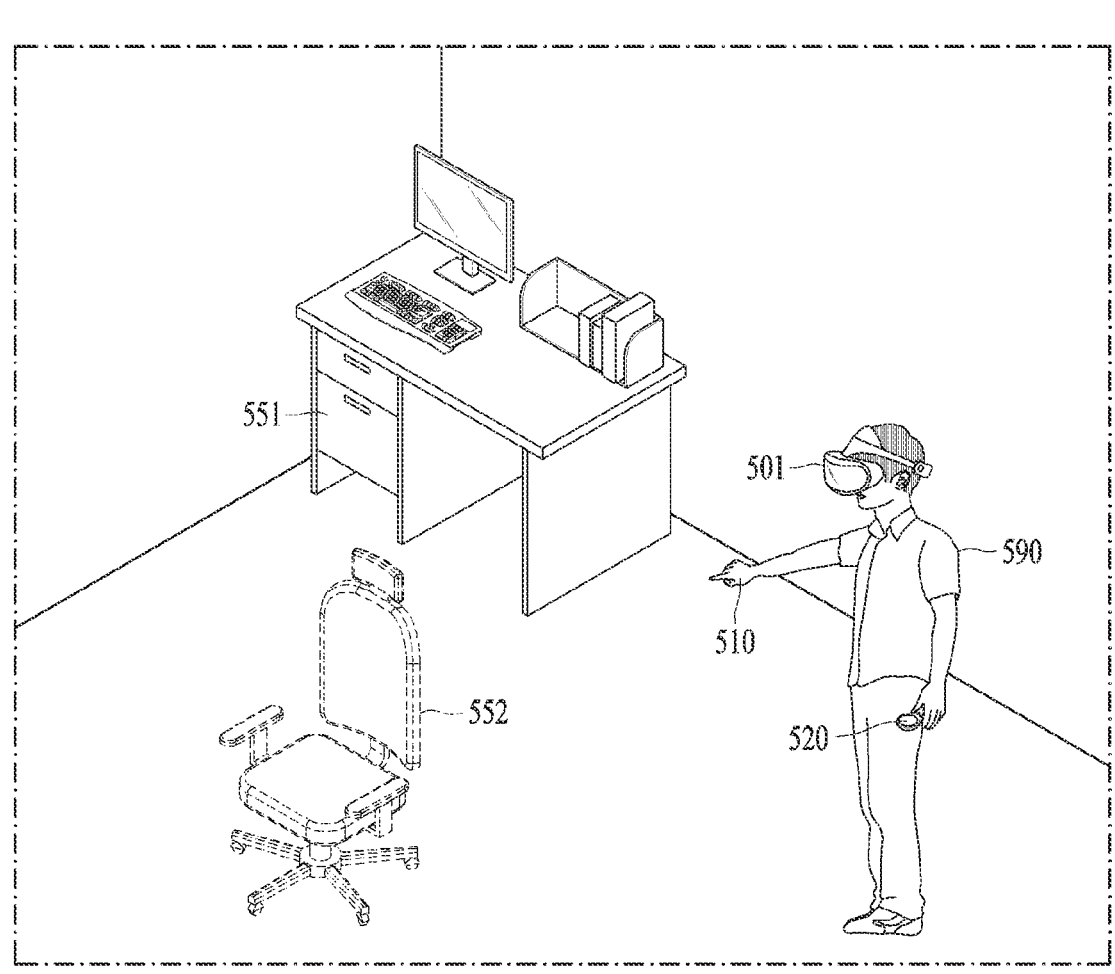
FIG. 5 illustrates example construction of a virtual space, an input from a user in the virtual space, and an output with respect to the user, according to various embodiments.

FIG. 5 illustrates example construction of a virtual space, an input from a user in the virtual space, and an output with respect to the user, according to various embodiments.

An electronic device (e.g., the electronic device 101 of FIG. 1, the electronic device 201 of FIG. 2, the electronic device 301 of FIG. 3, or the electronic device 401 of FIG. 4) may use a sensor to obtain spatial information about a physical space having the sensor. The spatial information may include the geographic position of the physical space having the sensor, the size of the physical space, the appearance of the physical space, the position of a physical object 551 in the physical space, the size of the physical object 551, and the appearance of the physical object 551, and illuminant information. The appearance of the physical space and the appearance of the physical object 551 may include at least one of the shape, texture, and color with respect to the physical space and the physical object 551. The illuminant information may, for example, be information about a light source that emits light in the physical space and may include at least one of the intensity, direction, and/or color of an illuminant (e.g., light source). The sensor described above may collect information to provide augmented reality (AR). For example, referring to the AR device provided with reference to FIGS. 2, 3, and 4, the sensor may include a camera and a depth sensor, but is not limited thereto. The sensor may further include at least one of an IR sensor, a depth sensor (e.g., a LiDAR sensor, a radar sensor, or a stereo camera), a gyro sensor, an acceleration sensor, and/or a geomagnetic sensor.

An electronic device 501 may collect spatial information through several time frames. For example, in each of the time frames, the electronic device 501 may collect information about a space that belongs to a scene within a sensing range (e.g., an FOV) of the sensor at the position of the electronic device 501 in the physical space. The electronic device 501 may track change (e.g., a position movement or state change) of an object over time by analyzing the spatial information of several time frames. The electronic device 501 may integrally analyze the spatial information collected through a plurality of sensors and thus provide integrated spatial information about the integrated sensing range of the plurality of sensors (e.g., an image obtained by spatially stitching scenes around the electronic device 501 in the physical space).

The electronic device 501 according to an embodiment may analyze the physical space with three-dimensional (3D) information by utilizing various input signals of sensors (e.g., sensing data of a red, green, blue (RGB) camera, an IR sensor, a depth sensor, or a stereo camera). For example, the electronic device 501 may analyze at least one of the shape, size, and position of the physical space and the shape, size, and position of the physical object 551.

For example, the electronic device 501 may use sensing data (e.g., a captured image) of a camera to detect an object captured in a scene corresponding to the FOV of the camera. From a two-dimensional (2D) scene image, the electronic device 501 may determine a label (e.g., information that indicates the classification of an object and includes a value indicating a chair, a monitor, or a plant) of the physical object 551 and an area (e.g., a bounding box) occupied by the physical object 551 in the 2D scene. Accordingly, the electronic device 501 may obtain 2D scene information at a position that a user 590 faces. In addition, the electronic device 501 may also calculate the position of the electronic device 501 in the physical space based on the sensing data of the camera.

The electronic device 501 may use sensing data (e.g., depth data) of the depth sensor and may thus obtain the position information of the user 590 and the depth information of a real space in a direction that the user 590 faces. The depth information may, for example, indicate the distance from the depth sensor to each point and may be expressed as a depth map. The electronic device 501 may analyze the distance in each pixel unit at the 3D position that the user 590 faces.

The electronic device 501 may obtain information including a 3D point cloud and a mesh using a variety of sensing data. The electronic device 501 may obtain a plane, a mesh, or a 3D coordinate point cluster included in a space by analyzing the physical space. The electronic device 501 may obtain the 3D point cloud representing a physical object based on the obtained information as described above.

The electronic device 501 may analyze the physical space to obtain information including at least one of 3D position coordinates, the 3D shape, and the 3D size (e.g., a 3D bounding box) of a physical object in the physical space.

Accordingly, the electronic device 501 may obtain physical object information detected in the 3D space and semantic segmentation information about the 3D space. The physical object information may include at least one of the position, appearance (e.g., shape, texture, and color) and/or size of the physical object 551 in the 3D space. The semantic segmentation information may be obtained by semantically dividing a 3D space into subspaces and include, for example, information indicating that a 3D space is divided into an object and a background and information indicating that a background is divided into a wall, a floor, and a ceiling. As described above, the electronic device 501 may obtain and store the 3D information (e.g., spatial information) about the physical object 551 and the physical space. The electronic device 501 may store 3D position information of the user 590 in the space together with spatial information.

The electronic device 501 according to an embodiment may construct a virtual space 500 based on the physical position of the electronic device 501 and/or the physical position of the user 590. The electronic device 501 may generate the virtual space 500, referring to the spatial information described above. The electronic device 501 may generate the virtual space 500 having the same scale as the physical space based on the spatial information and may place an object in the generated virtual space 500. The electronic device 501 may provide complete virtual reality to the user 590 by outputting an image representing the entire physical space. The electronic device 501 may output an image replacing a part of the physical space and thus provide mixed reality (MR) or AR. In FIG. 5, for convenience of explanation, in an example, the virtual space 500 having a virtual object 552 may overlay the physical space having the physical object 551, the electronic device 501, and the user 590. Although the virtual space 500 is constructed based on the spatial information obtained by the analysis of the physical space described above, the electronic device 501 may construct the virtual space 500 regardless of the physical position of the user 590. Herein, the virtual space 500 may correspond to AR or VR and may also be referred to as a metaverse space.

For example, the electronic device 501 may provide a virtual graphic representation replacing at least some of the physical space. The electronic device 501 based on an OST may overlay a virtual graphic representation on a screen area corresponding to at least some of the screen display portion. The electronic device 501 based on video see-through may replace, with a virtual graphic representation, an image area corresponding to at least some of a space image corresponding to the physical space rendered based on the spatial information. The electronic device 501 may replace at least some of the background in the physical space with a virtual graphic representation but is not limited thereto. The electronic device 501 may not change the background but only add the virtual object 552 to the virtual space 500 based on the spatial information.

The electronic device 501 may arrange and output the virtual object 552 in the virtual space 500. The electronic device 501 may set the manipulation area of the virtual object 552 in a space occupied by the virtual object 552 (e.g., a volume corresponding to the external shape of the virtual object 552). The manipulation area may, for example, refer to an area where the virtual object 552 may be manipulated. In addition, the electronic device 501 may replace the physical object 551 with the virtual object 552 and output the virtual object 552. The virtual object 552 corresponding to the physical object 551 may have a shape that is the same as or similar to the physical object 551 but is not limited thereto. The electronic device 501 may not output the virtual object 552 replacing the physical object 551 but set the manipulation area in a space occupied by the physical object 551 or at a position corresponding to the physical object 551. That is, the electronic device 501 may transmit, to the user 590, visual information (e.g., light reflected from the physical object 551 or a captured image of the physical object 551) representing the physical object 551 without any change and may set the manipulation area on the physical object 551. The manipulation area may be set to have the same shape and volume as the space occupied by the virtual object 552 or the physical object 551 but is not limited thereto. The electronic device 501 may set the manipulation area to be less than the space occupied by the virtual object 552 or the physical object 551.

According to an embodiment, the electronic device 501 may place the virtual object 552 (e.g., an avatar object) representing the user 590 in the virtual space 500. When an avatar object is provided in the first-person view, the electronic device 501 may render a graphic representation corresponding to a part of the avatar object (e.g., the hand or torso) to the user 590 through the display described above (e.g., an OST display or a video see-through display) but is not limited thereto. When the avatar object is provided in the third-person view, the electronic device 501 may provide the user 590 with a graphic representation corresponding to the entire appearance (e.g., the back view) of the avatar object through the display described above. The electronic device 501 may provide the user 590 with an experience integrated with the avatar object.

In addition, the electronic device 501 may provide the avatar object of another user who has also entered the virtual space 500. The electronic device 501 may receive feedback information that is the same as or similar to feedback information (e.g., information based on at least one of sight, hearing, and touch) provided to another electronic device that has also entered the virtual space 500. For example, when an object is placed in the virtual space 500 and a plurality of users accesses the virtual space 500, electronic devices of the plurality of users may receive the feedback information (e.g., a graphic representation, a sound signal, or haptic feedback) of the same object and may provide the feedback information to their users.

The electronic device 501 may detect an input to an avatar object of the other electronic device and may receive feedback information from the avatar object of the other electronic device. Exchange of an input and feedback for each of the virtual spaces 500 may, for example, be performed by a server (e.g., the server 108 of FIG. 1). For example, a server (e.g., a server providing a metaverse space) may transfer, to the users, an input and feedback between the avatar object of the user 590 and the avatar object of the other user but is not limited thereto. The electronic device 501 may directly establish communication with the other electronic device to thus provide an input based on an avatar object or receive feedback without involving a server.

For example, the electronic device 501 may determine that the user 590 selects the physical object 551 corresponding to the selected manipulation area, based on the detection of an input of the user 590 for selecting the manipulation area. The input of the user 590 may include at least one of a gesture input using a body part (e.g., the hand or eye) and an input using a separate accessory device for VR.

The gesture input may be an input corresponding to an identified gesture based on the tracking of a body part 510 of the user 590 and may include, for example, an input for indicating or selecting an object. The gesture input may include at least one of a gesture in which a body part (e.g., the hand) faces an object over a predetermined amount of time, a gesture in which a body part (e.g., the finger, eye, or head) points at an object, and/or a gesture in which a body part spatially contacts an object. A gesture of pointing at an object with the eye may be identified based on ET. A gesture of pointing at an object with the head may be identified based on head tracking.

Tracking of the body part 510 of the user 590 may be mainly performed based on the camera of the electronic device 501 but is not limited thereto. The electronic device 501 may track the body part 510 based on cooperation between sensing data (e.g., image data of a camera and depth data of a depth sensor) of a vision sensor and information (e.g., controller tracking and finger tracking in a controller) collected by an accessory device to be described below. Finger tracking may be performed by sensing the distance or contact between an individual finger and a controller based on a sensor (e.g., an IR sensor) embedded in the controller.

An accessory device for VR may include a useable device, a wearable device, a controller device 520, and other sensor-based devices. The useable device may be a device used and controlled by the user 590 and may include, for example, at least one of a treadmill-type device and/or a chair-type device. The wearable device may be a manipulation device worn on at least a part of the body of the user 590 and include, for example, at least one of a full body/half body suit-type controller, a vest-type controller, a shoe-type controller, a bag-type controller, and a glove-type controller (e.g., a haptic glove), and/or a face mask-type controller. The controller device 520 may include, for example, an input device (e.g., a stick-type controller or a firearm) manipulated by the body part 510 including the hand, foot, toe, or the like.

The electronic device 501 may establish direct communication with the accessory device and track at least one of the position and motion of the accessory device but is not limited thereto. The electronic device 501 may communicate with the accessory device via a base station for VR.

For example, the electronic device 501 may determine the virtual object 552 to be selected based on detection of an act of gazing at the virtual object 552 for a predetermined period of time or more through the eye gaze tracking technology described above. In an embodiment, the electronic device 501 may recognize a gesture pointing at the virtual object 552 through hand tracking technology. The electronic device 501 may determine that the virtual object 552 is selected based on a tracked hand pointing at the virtual object 552 for a predetermined period of time or more or based on the hand of the user 590 contacting or entering an area occupied by the virtual object 552 in the virtual space 500. The electronic device 501 may provide feedback to be described below as a response to the input of the user 590 described above.

The feedback may include visual feedback, auditory feedback, haptic feedback, olfactory feedback, or gustatory feedback. The feedback may be rendered by the server 108, the electronic device 101, or the external electronic device 102 as described with respect to FIG. 1.

The visual feedback may include an operation of outputting an image on a display (e.g., a transparent display or an opaque display) of the electronic device 501.

The auditory feedback may include an operation of outputting sound through a speaker of the electronic device 501.

The haptic feedback may include force feedback simulating weight, shape, texture, size, and dynamics. For example, a haptic glove may include a haptic element (e.g., an electric muscle) capable of simulating the sense of touch by tensing and relaxing the body of the user 590. The haptic element inside the haptic glove may, for example, act as a tendon. The haptic glove may provide haptic feedback to the entire hand of the user 590. The electronic device 501 may provide feedback representing the shape, size, and stiffness of an object through the haptic glove. For example, the haptic glove may generate force that mimics the shape, size, and stiffness of an object. The exoskeleton of the haptic glove (or a suit-type device) may include a sensor and a finger motion measurement device and may transmit, to a finger of the user 590, cable-pulling force (e.g., force based on electromagnetism, a direct current (DC) motor, or air pressure) and thus transfer haptic information to the body of the user 590. Hardware that provides the haptic feedback may include a sensor, an actuator, a power supply, and a wireless transmission circuit. The haptic glove may work, for example, by inflating and deflating an inflatable air bladder on the surface of the haptic glove.

The electronic device 501 may provide feedback to the user 590 based on the selection of an object in the virtual space 500. For example, the electronic device 501 may output, on the display, a graphic representation (e.g., a representation highlighting a selected object) indicating the selected object. In another example, the electronic device 501 may output sound (e.g., a voice) guiding the selected object through a speaker. In another example, the electronic device 501 may provide the user 590 with haptic motion that simulates the haptic sense of a corresponding object by transmitting an electrical signal to a haptic supporting accessory device (e.g., a haptic glove).

FIG. 6 is a flowchart illustrating an example process of generating a persona applied to an avatar object of a target user by an electronic device according to various embodiments.

According to an embodiment, a processor of an electronic device (e.g., the electronic device 101 of FIG. 1, the electronic device 201 of FIG. 2, the electronic device 301 of FIG. 3, the electronic device 401 of FIG. 4, or the electronic device 501 of FIG. 5) may create an avatar object representing a target user and place the avatar object in a virtual space. The processor may create a persona applied to the avatar object representing the target user. The processor may render the avatar object in the virtual space by applying the created persona to the avatar object. The persona may represent a virtual person and identity and may include attributes applicable to the avatar object. Examples of the attributes included in a persona may include, but are not limited to, the personality, costume, gender, voice, tone of voice, expression, and/or mood. The processor may determine at least one of a state (e.g., sweaty or exhausted) of the avatar object, a facial expression (e.g., a happy expression or a sad expression) of the avatar object, and a voice (e.g., pitch and intonation) output by the avatar object, according to the persona applied to the avatar object.

According to an embodiment, the target user of the electronic device may enter the virtual space built by a server through a target user account. The processor of the electronic device may create a persona applied to the avatar object corresponding to the target user using information related to the target user.

Referring to FIG. 6, in operation 610, the processor of the electronic device may create a preliminary persona based on first information related to a history of the target user. The processor may collect the first information related to the history of the target user. The first information related to the history of the target user may include, for example, life pattern information of the target user and health information of the target user but is not limited thereto. The first information related to the history of the target user may, for example, be referred to as personal information of the target user.

In operation 620, the processor of the electronic device may create a first persona from the preliminary persona based on second information related to a time and a space of the target user and may apply the first persona to an avatar object corresponding to the target user in the virtual space. The processor may collect the second information related to the time and space of the target user. The second information related to the time and space of the target user may include at least some of weather information corresponding to the target user, location information corresponding to the target user, and/or time information corresponding to the target user. When the processor places the avatar object corresponding to the target user in the virtual space, the processor may apply the first persona to the avatar object and produce the avatar in the virtual space.

In operation 630, when the processor of the electronic device detects the occurrence of an event related to the target user, the processor may create a second persona from the first persona based on the occurred event and apply the second persona to the avatar object corresponding to the target user instead of the first persona. The event related to the target user may include, for example, an event occurring with respect to the target user in a real space and/or an event occurring with respect to the avatar object corresponding to the target user in the virtual space.

Figure 7:
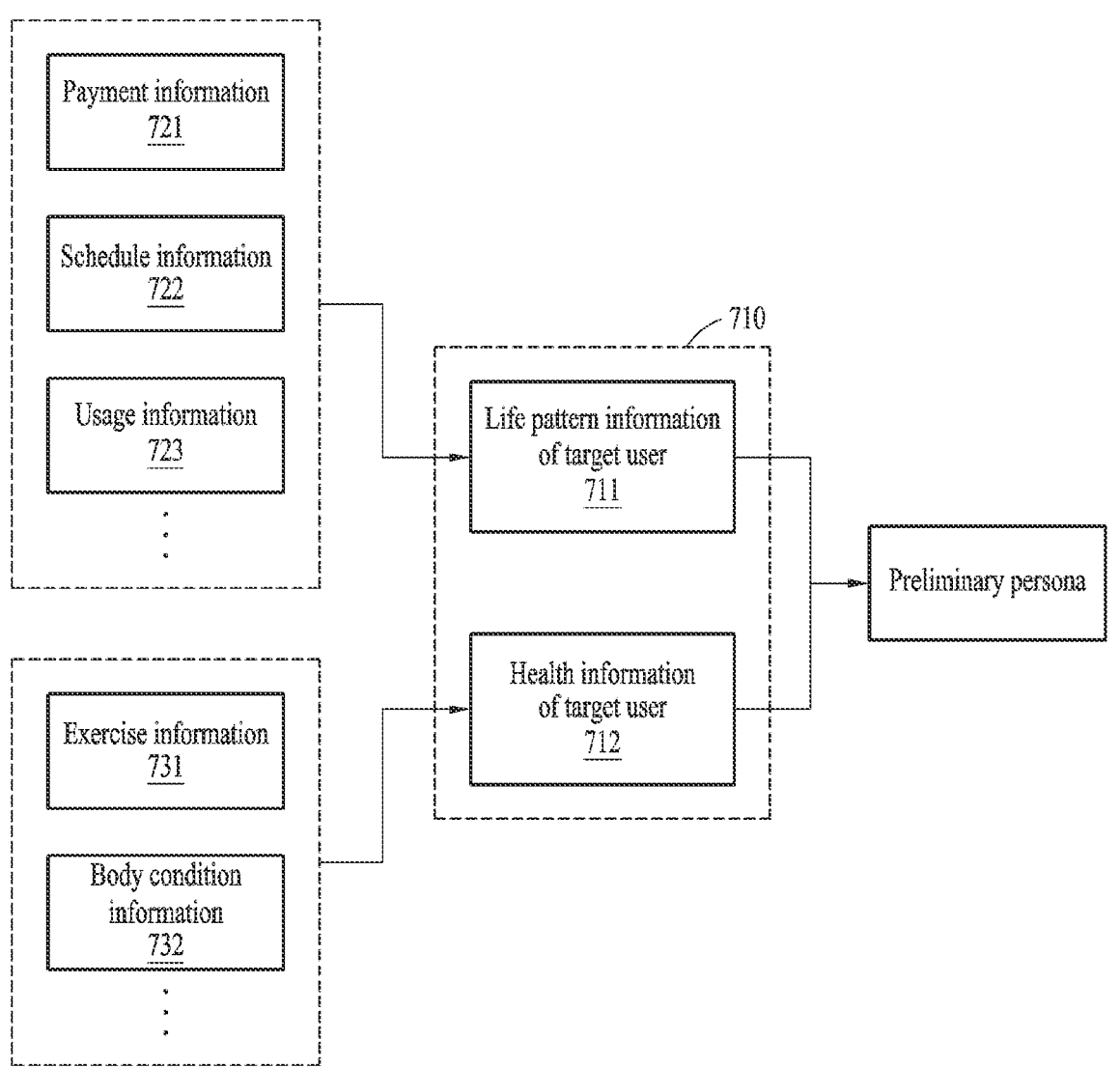
FIG. 7 is a diagram illustrating an example process of generating a preliminary persona based on first information related to user history by an electronic device, according to various embodiments.

FIG. 7 is a diagram illustrating an example process of generating a preliminary persona based on first information related to user history by an electronic device, according to various embodiments.

A processor of an electronic device (e.g., the electronic device 101 of FIG. 1, the electronic device 201 of FIG. 2, the electronic device 301 of FIG. 3, the electronic device 401 of FIG. 4, or the electronic device 501 of FIG. 5) according to an embodiment may collect first information related to a history of a target user. The processor may collect first information 710 through an application(s) installed on the electronic device. The first information 710 may include life pattern information 711 of the target user and health information 712 of the target user. That is, the processor may collect the first information 710 including the life pattern information 711 of the target user and the health information 712 of the target user through the application(s) installed on the electronic device.

The life pattern information 711 of the target user may include, for example, payment information 721 of the target user, schedule information 722 of the target user, and usage information 723 of the target user but is not limited to this. For example, the processor may collect the payment information 721 of the target user through a mobile payment application. The payment information 721 may include, for example, mobile card information, payment time information, payment location information, and/or payment amount information. For example, the processor may collect the schedule information 722 of the target user through a schedule application. The target user may input scheduling information into the scheduling application. The processor may extract the schedule information input by the target user through the schedule application. The schedule information 722 may include, for example, schedule time information (e.g., a schedule start time and a schedule end time), schedule location information, and/or information about participants in a schedule. For example, the electronic device may obtain (or receive) the usage information 723 of the target user through a device management application. The usage information 723 may represent usage information of an Internet of Things (IoT) device that interworks with the electronic device and may include information about usage time (e.g., a use start time and an end use time) of the IoT device that interworks with the electronic device.

The health information 712 of the target user may include, but is not limited to, exercise information 731 of the target user and body condition information 732 of the target user. For example, the electronic device may collect the exercise information 731 of the target user through an exercise record application. The exercise information 731 may include, for example, the number of steps, consumed energy, and exercise time. For example, the electronic device may collect the body condition information 732 of the user through a health care application. The body condition information 732 may include, for example, heart rate information, body temperature information, stress information, blood pressure information, electrocardiogram information, and/or oxygen saturation information.

According to an embodiment, the processor of the electronic device may create a preliminary persona by updating setting information about at least one of attributes (e.g., the personality, costume, gender, voice, tone of voice, facial expression, and mood) included in a persona based on personal information included in the collected first information. The processor may start collecting the first information related to the history of the target user at a time when the target user accesses a server that constructs a virtual space with a target user account.

Figure 8:
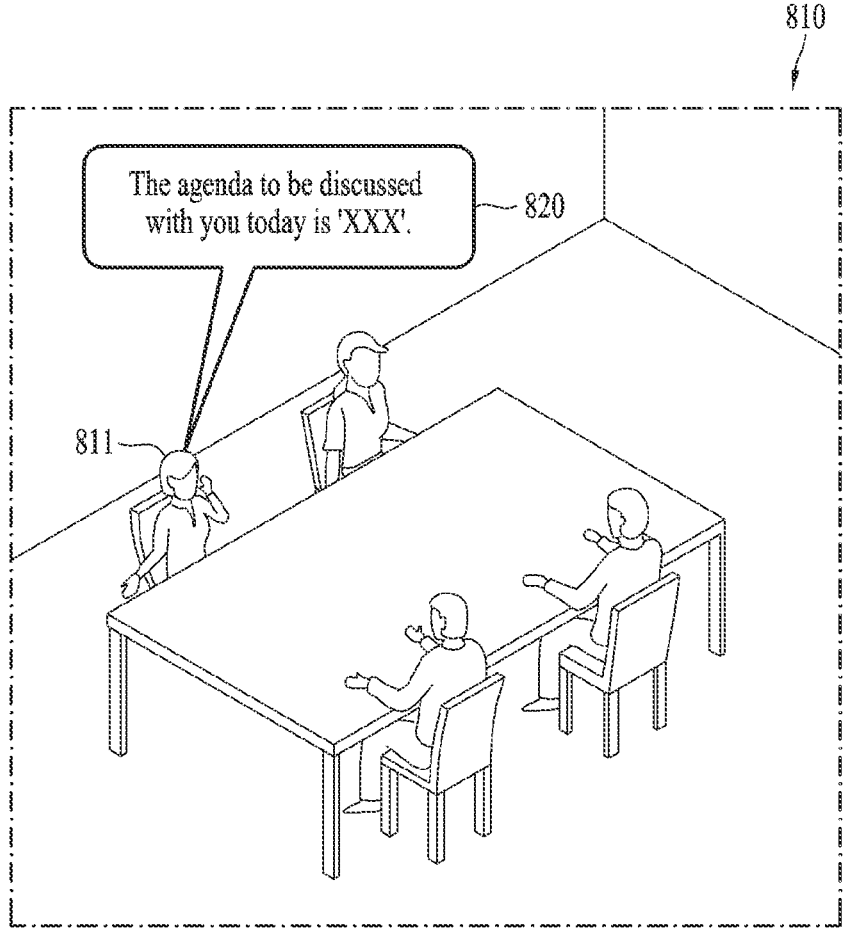
FIGS. 8 and 9 are diagrams illustrating examples of generating a preliminary persona based on first information by an electronic device, according to various embodiments.
Figure 9:
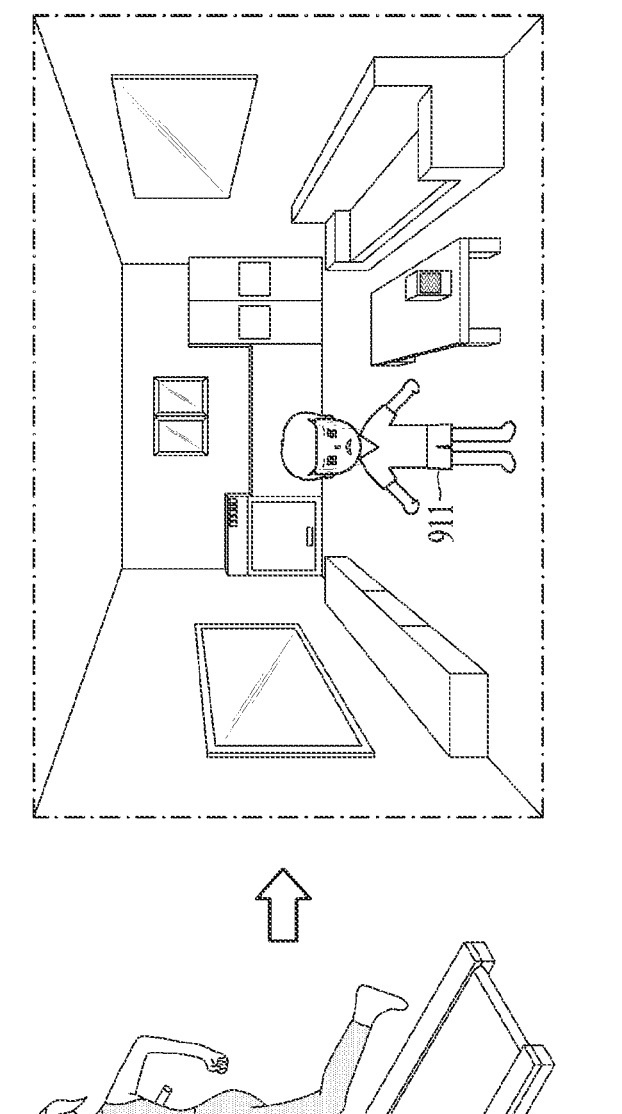

FIGS. 8 and 9 are diagrams illustrating examples of generating a preliminary persona based on first information by an electronic device, according to various embodiments.

FIG. 8 illustrates an example in which a processor of an electronic device (e.g., the electronic device 101 of FIG. 1, the electronic device 201 of FIG. 2, the electronic device 301 of FIG. 3, the electronic device 401 of FIG. 4, or the electronic device 501 of FIG. 5) according to an embodiment may update setting information about at least one of attributes included in a persona based on schedule information of a target user in life pattern information of the target user.

The target user may input a 'meeting' schedule to a schedule application installed on the electronic device. The processor may extract information about the 'meeting' schedule input by the target user through the schedule application. In the case of the target user inputting a 'meeting' schedule to the scheduling application, even when the type of schedule (e.g., a meeting, travel, study) is not input, the electronic device may determine the type of input schedule based on text recorded in relation to the input schedule. For example, when the processor identifies a word associated with a particular type of schedule (e.g., consultation or discussion) in the input text in relation to the input schedule, the processor may determine the input schedule to be a specific type of schedule (e.g., a 'meeting' schedule).

Referring to FIG. 8, when an avatar object 811 corresponding to the target user is placed in a virtual space 810 around the time to start the 'meeting' schedule input by the target user in the schedule application, the processor may update setting information about at least one of attributes included in the persona. For example, based on information about the 'meeting' schedule, the electronic device may set a voice output 820 of the avatar object 811 of the target user as a voice pitch and/or a voice volume appropriate for the meeting in the 'voice' attribute of the persona. For example, the processor may set the type of costume as a costume (e.g., a suit) appropriate for the meeting in a 'costume' attribute of the persona based on the information about the 'meeting' schedule.

According to an embodiment, the processor may update the setting information about at least one of attributes included in the persona based on payment information of the target user in the life pattern information of the target user. The processor may collect the payment information of the target user through a mobile payment application and obtain payment location information (e.g., a department store, a restaurant, or a cosmetics store) of the target user and/or payment amount information from the collected payment information. The electronic device may update setting information about a 'mood' attribute of the persona based on the payment information of the target user. For example, the processor may select one point from a lattice including a first axis from 'negative valence' (e.g., sad) to 'positive valence' (e.g., happy) and a second axis from 'comfort' to 'excitement' and may thus set the 'mood' attribute of the persona. When the most recent payment location of the target user is a department store, the processor may move a point that is previously selected corresponding to the 'mood' attribute in the lattice, in a direction toward the 'positive valence' based on the first axis and the 'excitement' based on the second axis and may update the setting information about the 'mood' attribute as values of the first axis and the second axis corresponding to the moved point.

Referring to FIG. 9, a processor of an electronic device (e.g., the electronic device 101 of FIG. 1, the electronic device 201 of FIG. 2, the electronic device 301 of FIG. 3, the electronic device 401 of FIG. 4, or the electronic device 501 of FIG. 5) according to an embodiment may update setting information about at least one of attributes included in a persona based on body state information in health information of a target user. Similarly, the processor may update setting information about at least one of attributes included in the persona based on exercise information in the health information of the target user. For example, it is assumed that a target user 901 is exercising on a treadmill in a real space. The processor may collect the body state information of the target user 901 in the real space through a health care application. For example, when the body temperature of the target user 901 exceeds a preset body temperature, the processor may set a visual function in an 'appearance' attribute of the persona, such that an avatar object 911 of the target user may sweat and the costume of the target user may look wet. For example, when the exercise intensity of the target user 901 exceeds a preset exercise intensity, the processor may set the 'appearance' attribute of the persona such that the muscles of the avatar object 911 of the target user may increase in size. The processor may set the 'expression' attribute of the persona such that the avatar object 911 of the target user may make an exhausted face.

According to an embodiment, when there is a plurality of individual pieces of information that commonly updates setting information about one attribute of the persona among individual pieces of information included in the collected first information, the processor of the electronic device may update the setting information about the one attribute of the persona by setting a higher weight for information more recently generated in the plurality of individual pieces of information. For example, the processor may collect, as the first information, payment information at a restaurant created by the target user at a first time point and payment information at a department store created by the target user at a second time point and may commonly update the setting information about the 'mood' attribute of the persona based on the payment information at the restaurant and the payment information at the department store. The second time point may take place later than the first time point. In this case, the processor may update setting information about the 'mood' attribute by setting a weight for the payment information at the department store to be higher than a weight for the payment information at the restaurant.

Figure 10:
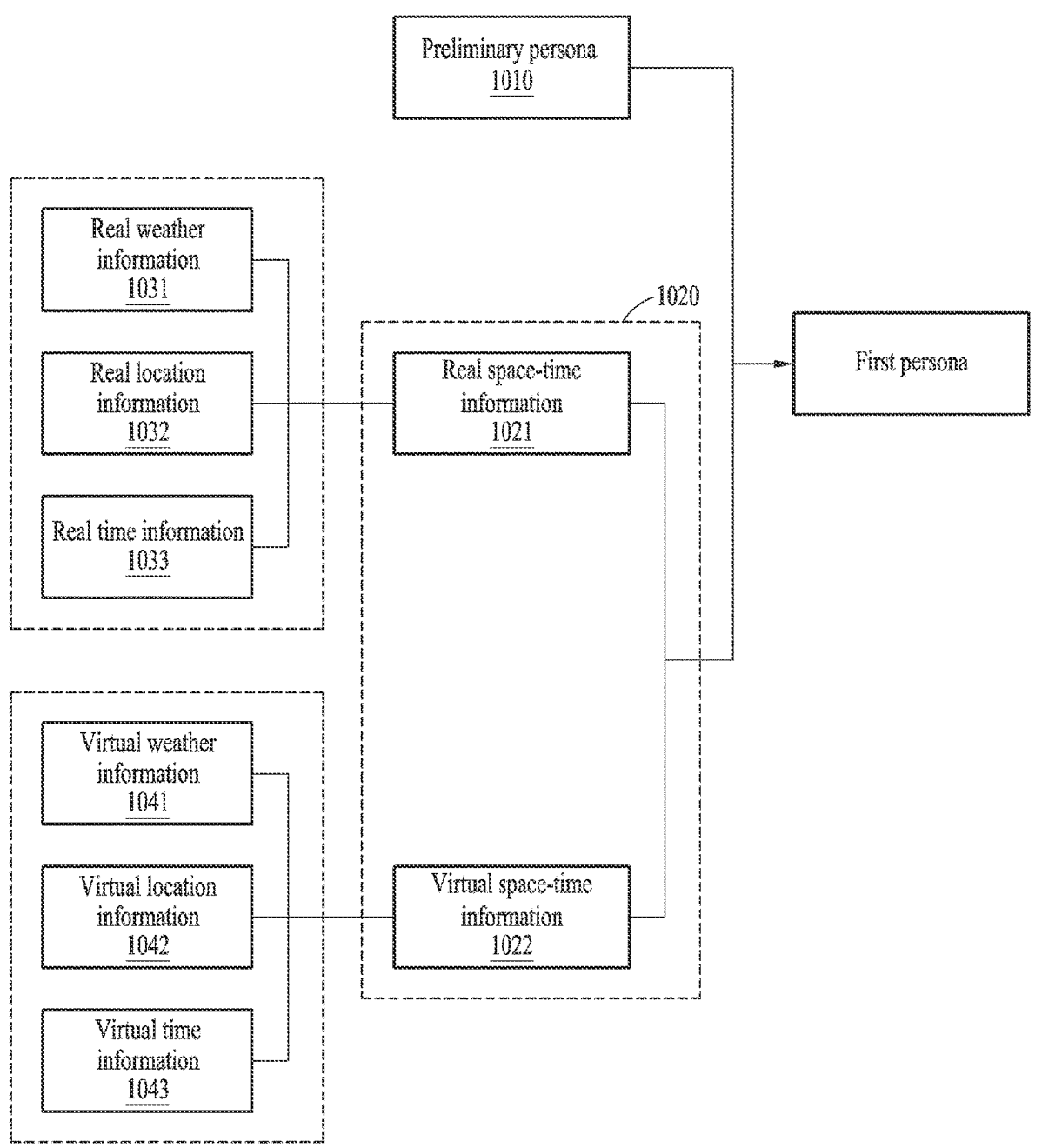
FIG. 10 is a diagram illustrating an example process in which an electronic device according to various embodiments generates a first persona by collecting second information related to time and space of a target user.

FIG. 10 is a diagram illustrating an example process in which an electronic device according to an embodiment generates a first persona by collecting second information related to time and space of a target user.

According to an embodiment, a processor of an electronic device (e.g., the electronic device 101 of FIG. 1, the electronic device 201 of FIG. 2, the electronic device 301 of FIG. 3, the electronic device 401 of FIG. 4, or the electronic device 501 of FIG. 5) may collect second information 1020 related to a time and a space of the target user. The second information may include real time and space information corresponding to a target user in a real space (hereinafter, referred to as 'real space-time information 1021') and virtual time and space information corresponding to an avatar object of the target user in a virtual space (hereinafter, 'virtual space-time information 1022').

According to an embodiment, the processor may collect the real space-time information 1021 through an application(s) in the electronic device and a global positioning system (GPS) module (e.g., including GPS circuitry). In addition, the processor may collect the virtual space-time information 1022 through a server constructing the virtual space.

The real space-time information 1021 may include real weather information 1031 corresponding to the target user, real location information 1032 corresponding to the target user, and real time information 1033 corresponding to the target user but is not limited thereto. For example, the processor may collect the real weather information 1031 corresponding to the target user in the real space through a weather application. The real weather information 1031 corresponding to the target user may, for example, refer to information about the surrounding weather of the target user in the real space and may include at least one of outdoor/indoor temperature information, dust concentration information, precipitation information, and/or sunlight information. For example, the electronic device may collect the real location information 1032 corresponding to the target user in the real space through a GPS module. The real location information 1032 corresponding to the target user may, for example, represent information about the position of the target user in the real space. The information about the location of the target user may include information about a place (e.g., a museum or a movie theater) where the target user is. For example, the electronic device may collect the real time information 1033 corresponding to the target user through a time application. The real time information 1033 may, for example, be information related to time in the real space and may include a time period (e.g., dawn, morning, daytime, and evening), day of the week (e.g., Monday, Tuesday, or Wednesday), and/or a season (e.g., spring, summer, fall, or winter).

The virtual space-time information 1022 may include virtual weather information 1041 corresponding to the target user, virtual location information 1042 corresponding to the target user, and/or virtual time information 1043 corresponding to the target user but is not limited thereto. For example, the electronic device may receive the virtual weather information 1041, the virtual location information 1042, and the virtual time information 1043 from the server constructing the virtual space. Here, the virtual weather information 1041 corresponding to the target user may represent, for example, information about the surrounding weather of an avatar object of the target user in the virtual space. Similarly, the virtual location information 1042 corresponding to the target user may represent, for example, information about the position of the avatar object of the target user in the virtual space. The virtual time information 1043 corresponding to the target user may represent, for example, information at a time in the virtual space.

According to an embodiment, the processor may update setting information about at least one of attributes included in a preliminary persona 1010 based on individual pieces of information included in second information 1020 to create a first persona. The processor may start collecting the second information related to the time and space of the target user, for example, at a time when the target user accesses the server constructing the virtual space with a target user account.

According to an embodiment, the processor may change setting information about at least one of attributes included in the preliminary persona according to the type of space where the avatar object of the target user is in the virtual space. Based on the virtual location information 1042, the processor may perform a first determination with respect to whether the space where the avatar object of the target user is in the virtual space is indoors or outdoors. Based on the virtual location information 1042, the processor may perform a second determination with respect to whether the space where the avatar object of the target user is in the virtual space is a private space or a public space. The processor may update the setting information about the attributes of the preliminary persona with one piece of the setting information selected according to a combination of the first determination and the second determination from among a plurality of previously generated pieces of the setting information related to the type of space.

For example, when the space where the avatar object of the target user is located is an indoor space and a private space, the processor may change the setting information about the attributes of the preliminary persona with preset first setting information. For example, the first setting information may include information about setting the type of costume in a 'costume' attribute as a costume (e.g., pajamas) suitable for indoors and the private space. When the space where the avatar object of the target user is located is an indoor space and a public space, the processor may change the setting information about the attributes of the preliminary persona with preset second setting information. For example, the second setting information may include information about lowering, to a preset level or less in a 'voice' attribute, the voice volume of the avatar object of the target user and the voice volume of the avatar object of another user. When the space where the avatar object of the target user is located is an outdoor space and a private space, the processor may change the setting information about the attributes of the preliminary persona with preset third setting information. For example, the third setting information may include information about setting, in a 'tone of voice' attribute, a conversation style as a conversation type with a comfortable individual. When the space where the avatar object of the target user is located is an outdoor space and a public space, the processor may change the setting information about the attributes of the preliminary persona with preset fourth setting information. For example, the fourth setting information may include information about setting a smile expression in an 'expression' attribute.

Figure 11:
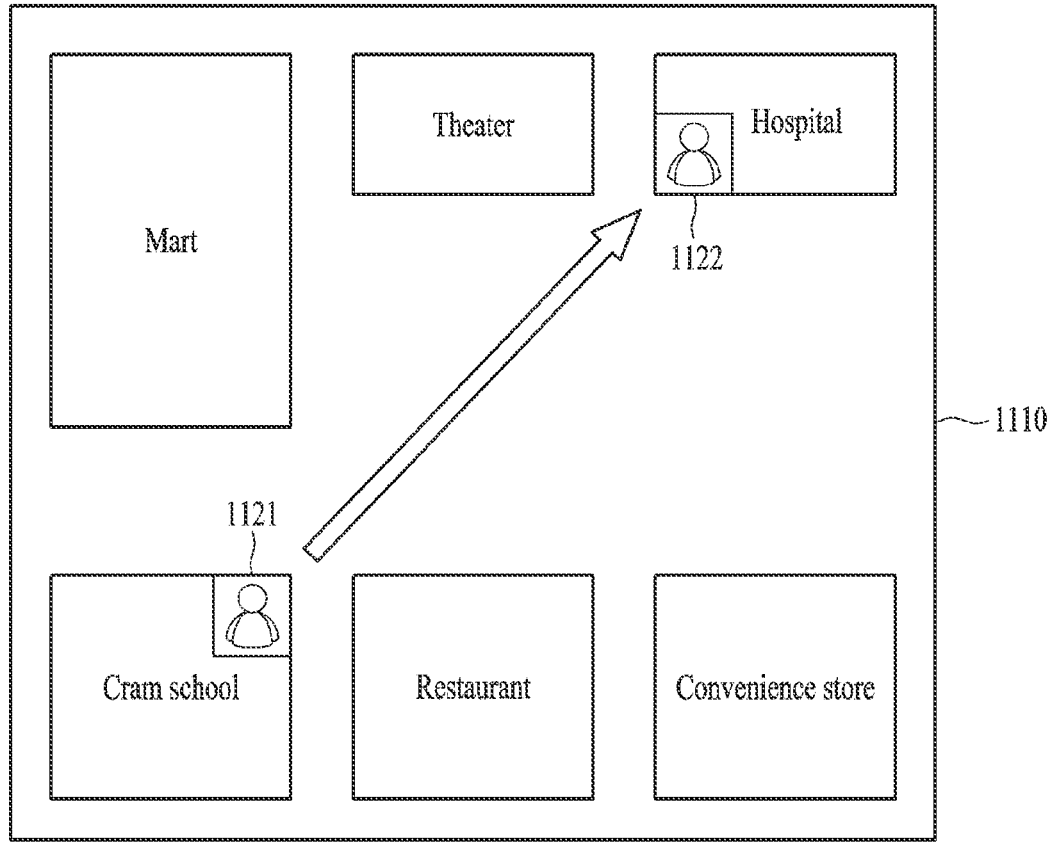
FIG. 11 is a diagram illustrating an example first event generated by position movement of a target user or position movement of an avatar object of the target user.
Figure 12:
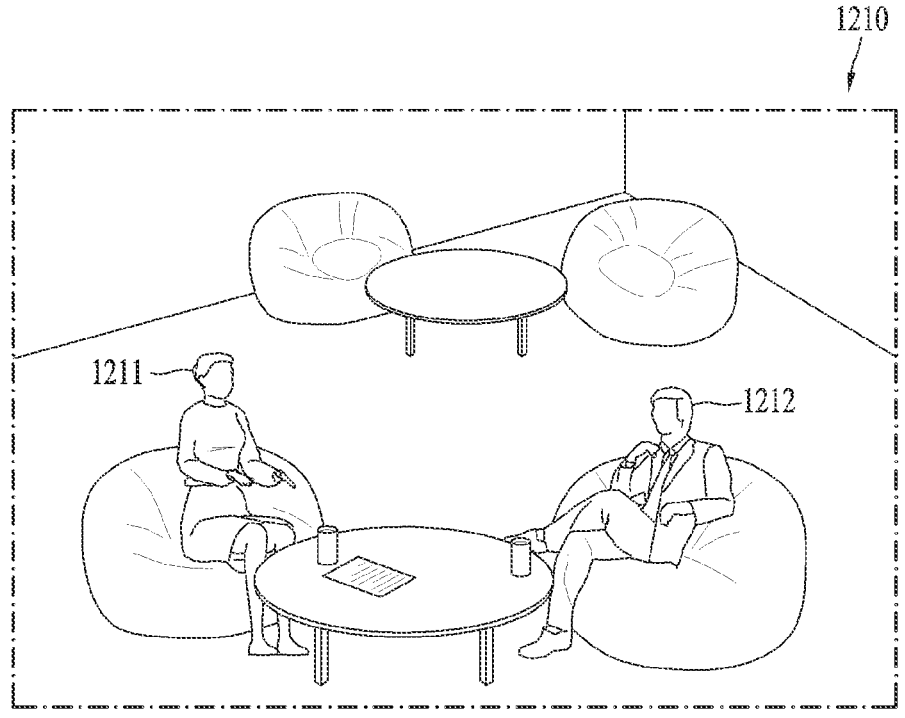
FIG. 12 is a diagram illustrating an example second event generated by an interaction between a target user and another external user.
Figure 13:
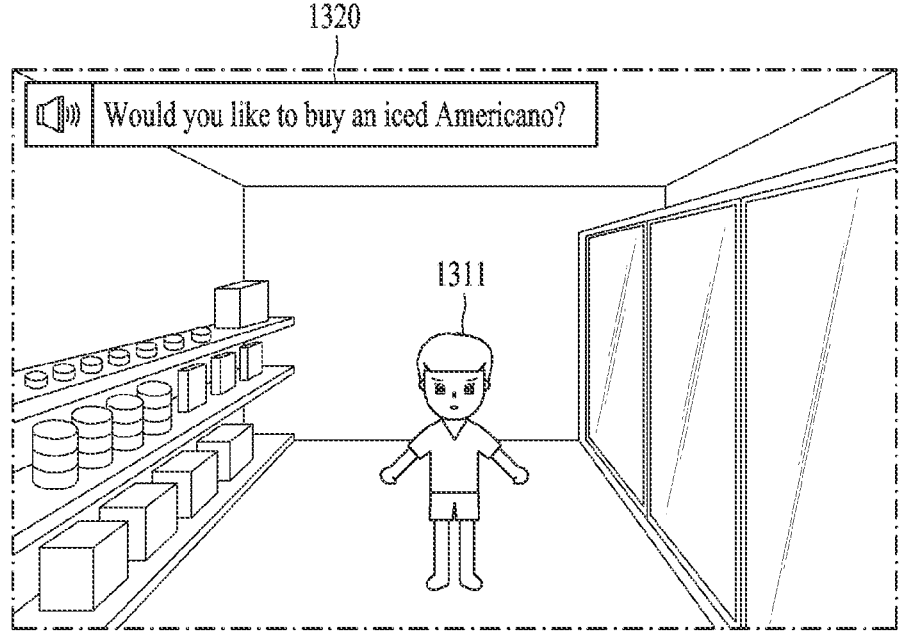
FIG. 13 is a diagram illustrating an example third event generated by an interaction between a target user and a server.

FIGS. 11, 12, and 13 are diagrams illustrating examples of occurrences of events related to a target user according to various embodiments.

According to an embodiment, a processor of an electronic device (e.g., the electronic device 101 of FIG. 1, the electronic device 201 of FIG. 2, the electronic device 301 of FIG. 3, the electronic device 401 of FIG. 4, or the electronic device 501 of FIG. 5) may detect occurrence of an event related to the target user. The event related to the target user may, for example, include a first event caused by the movement of the target user or the movement of an avatar object corresponding to the target user, a second event caused by an interaction between the target user and another external user, and a third event generated by an interaction between the target user and a server.

FIG. 11 is a diagram illustrating a first example event generated by the position movement of a target user or the position movement of an avatar object of the target user according to various embodiments.

According to an embodiment, the processor may detect the position movement of the target user in a real space based on real location information (e.g., the real location information 1032 of FIG. 10). When the moved position of the target user corresponds to a first place, the processor may determine occurrence of the first event and update setting information about attributes of a first persona with setting information suitable for the first place in a real space. Referring to FIG. 11, the processor may receive the real location information 1032 of the target user from a GPS module and detect that the target user moves from a first location 1121 to a second location 1122 in the real space. When the second location 1122, to which the target user moves, is a 'hospital', the electronic device may detect occurrence of the first event and update the setting information about the attributes of the first persona with setting information suitable for the 'hospital' in the real space. In an example, the setting information suitable for the 'hospital' may include, for example, information about setting a calm facial expression in an 'expression' attribute.

Similarly, the processor may detect the movement of the avatar object of the target user in a virtual space based on virtual location information (e.g., the virtual location information 1042 of FIG. 10). When the moved position of the avatar object of the target user is a second place, the processor may detect occurrence of the first event and update the setting information about the attributes of the first persona with setting information suitable for the second place in the virtual space. When the processor detects the location movement of the target user and the moved location of the target user corresponds to a place, the 'beach', the processor may detect the occurrence of the first event and update the setting information about the attributes of the first persona with setting information suitable for the place, that is, the 'beach', in the virtual space. For example, the setting information suitable for the place, that is, 'beach', may include, for example, information about setting the type of costume as a swimsuit in a 'costume' attribute.

According to an embodiment, the processor may provide VR to the target user by outputting an image representing the entire physical space or may provide AR to the target user by outputting an image representing a part of the physical space.

For example, when the processor provides VR to the target user, the location of the target user in the real space may be different from the location of the avatar object of the target user in the virtual space. In this case, the processor may update the setting information of the attributes of the persona by setting a weight for the place where the target user is located in the real space to be lower than a weight for the place where the avatar object of the target user is located in the virtual space.

For example, when the electronic device provides AR to the target user, the location of the target user in the real space may be the same as the location of the avatar object of the target user. In this case, the electronic device may set a weight for the place where the target user is located in the real space to be the same as a weight for the place where the avatar object of the target user is located in the virtual space and may then update the setting information about the attributes of the persona.

FIG. 12 is a diagram illustrating a second example event generated by an interaction between a target user and another external user according to various embodiments.

When there is an avatar object 1212 corresponding to another user within a preset distance from an avatar object 1211 corresponding to a target user in a virtual space 1210 and an interaction between the target user and the other user is detected, a processor of an electronic device (e.g., the electronic device 101 of FIG. 1, the electronic device 201 of FIG. 2, the electronic device 301 of FIG. 3, the electronic device 401 of FIG. 4, or the electronic device 501 of FIG. 5) according to an embodiment may detect occurrence of a second event and update setting information about attributes of a first persona with setting information corresponding to the detection of the occurrence of the second event and the interaction of the other user with the target user. The target user and the other user may simultaneously access the virtual space constructed by a server. The other user may access the virtual server and attempt the interaction with the target user through an input of touching the avatar object 1211 corresponding to the target user.

According to an embodiment, the processor may collect information about the other user when the processor detects the interaction of the other user with the target user. The information about the other user may include intimacy information between the target user and the other user and common information between the target user and the other user.

According to an embodiment, the processor may collect information about the other user through an application(s) installed on the electronic device and then obtain the intimacy information between the target user and the other user and the common information between the target user and other users.

According to an embodiment, the processor may check whether there is a photo or video of the other user through a gallery application. When there is a photo or video of the other user, the processor may obtain information about the face of the other user captured in the photo or video capturing the other user, a capturing time, and a capturing location. The electronic device may obtain (e.g., calculate) the degree of intimacy between the target user and the other user based on the number of photos or videos capturing the other user. According to an embodiment, the processor may check whether a message has been transmitted to and received from the other user through a text service application and/or an e-mail application. When a message has been transmitted and received between the target user and the other user, the processor may obtain information about the number of times the message is transmitted and received and information about the content of the messages. The processor may obtain (e.g., calculate) the intimacy information between the target user and the other user based on the number of messages transmitted and received between the target user and the other user and the information about the content of the messages.

According to an embodiment, the electronic device may obtain (e.g., calculate) the common information between the target user and the other user by collecting information about the other user through a server or a social media application.

For example, the other user may transmit, to the server, their personal information to be publicly disclosed and the server may transmit the disclosed personal information of the other user to the target user with whom the other user attempts the interaction. In this case, the target user may receive the personal information that the other user has transmitted to the server, from the other user who attempts the interaction with the target user. For example, the processor may collect information about the other user (e.g., uploaded posts) through a social media application. The processor may obtain (e.g., calculate) the common information between the target user and the other user through information related to the target user (e.g., the first information or the second information) and collected information about the other user.

According to an embodiment, when the processor detects an interaction of the other user with the target user, the processor may collect information about the other user and update setting information about attributes of a first persona based on at least one of the intimacy information and the common information between the target user and the other user.

First, the processor may change the setting information about the attributes of the first persona based on the common information between the target user and the other user. For example, referring to FIG. 12, the processor may confirm that the other user is in a place, that is, 'Haeundae' beach, in the real space through a social media application and determine that the target user is also at the same location as the place, that is 'Haeundae' beach, in the real space. The processor may extract the common information that the target user and the other user are in the place, that is, 'Haeundae' beach, in the real space at the same time. In this case, the processor may set the type of costume as an active costume suitable for a beach in the 'costume' attribute of the first persona and increase a voice in the 'voice' attribute of the first persona.

In addition, the processor may change the setting information about the attributes of the first persona based on the intimacy information between the target user and the other user. For example, the processor may determine that the intimacy between the target user and the other user is a threshold score or greater through an application in the electronic device. In this case, during an interaction between the target user and the other user in the virtual space, the processor may set the conversation style as a conversation style with a comfortable individual in a 'tone of voice' attribute of the first persona.

According to an embodiment, during the interaction between the target user and the other user, the processor may temporarily update the setting information about the attributes of the first persona. In response to the termination of the interaction between the target user and the other user, the processor may change the setting information about the attributes of the first persona to the setting information before the update.

FIG. 13 is a diagram illustrating a third example event generated by an interaction between a target user and a server according to various embodiments.

A processor of an electronic device (e.g., the electronic device 101 of FIG. 1, the electronic device 201 of FIG. 2, the electronic device 301 of FIG. 3, the electronic device 401 of FIG. 4, or the electronic device 501 of FIG. 5) according to an embodiment may transmit, to a server, information used to create a first persona. When the processor detects an interaction between a target user and the server optimized based on the transmitted information, the processor may detect the occurrence of the third event and update setting information about attributes of a first persona with setting information corresponding to the interaction of the server with the target user.

According to an embodiment, the server may receive information used to create the first persona applied to an avatar object 1311 of the target user from the electronic device. The server may attempt an interaction with the target user using the information used to create the first persona received from the electronic device. The information used to create the first persona may include first information related to the history of the target user and second information related to a time and a space of the target user. The server attempting an optimized interaction with the target user based on the information received from the electronic device may, for example, refer to the server determining the circumstance of the target user based on the information used to create the first persona received from the electronic device and attempting an interaction necessary or appropriate for the current circumstance of the target user.

For example, referring to FIG. 13, the server may receive, from the electronic device, information indicating that the target user has performed an exercise in a real space and information indicating that the surrounding weather of the target user exceeds 30 degrees in the real space, as the information used to create the first persona. The server may attempt an optimized interaction based on the information received from the electronic device. The server may provide a voice output 1320 (e.g., "Would you like to buy an iced Americano?") to the target user as an interaction with the target user. The processor may detect the interaction of the server with the target user as the occurrence of the third event and may update the setting information about the attributes of the first persona with setting information corresponding to the interaction of the server with the target user. For example, when the target user determines that the interaction of the server with the target user is appropriate for the circumstance of the target user, the processor may set the avatar object 1311 of the target user to have a smile expression in an 'expression' attribute of the first persona during the interaction of the server with the target user.

An electronic device according to an example embodiment may include a display module (including, e.g., a display), a memory configured to store computer-executable instructions, and a processor configured to execute the instructions by accessing the memory. The processor may be configured to create a preliminary persona based on first information related to history of a target user, create a first persona from the preliminary persona based on second information related to a time and a space of the target user and apply the first persona to an avatar object corresponding to the target user placed in a virtual space, and, when an occurrence of an event related to the target user is detected, create a second persona from the first persona based on the event occurrence and apply the second persona to the avatar object corresponding to the target user instead of the first persona.

In an example embodiment, the processor may be configured to collect the first information including life pattern information of the target user and health information of the target user through an application installed on the electronic device and create the preliminary persona by updating setting information about at least one attribute included in a persona based on individual pieces of information included in the collected first information.

In an example embodiment, when there is a plurality of individual pieces of information for commonly updating setting information about one attribute among the individual pieces of information included in the first information, the processor may be configured to update the setting information about the one attribute by setting a first (e.g., higher) weight for information generated later among the plurality of individual pieces of information.

In an example embodiment, the second information may include real space-time information corresponding to the target user in a real space and virtual space-time information corresponding to the avatar object in a virtual space and the processor may be configured to collect the real space-time information through an application installed on the electronic device and a global positioning system (GPS) module (including, e.g., GPS circuitry), collect the virtual space-time information through a server constructing the virtual space, and create the first persona by updating setting information about at least one attribute included in the preliminary persona based on individual pieces of information included in the collected second information.

In an example embodiment, the processor may be configured to perform a first determination with respect to whether a space where the avatar object is located in the virtual space is indoors or outdoors, perform a second determination on whether the space where the avatar object is located in the virtual space is a private space or a public space, and update the setting information about attributes of the preliminary persona with one piece of setting information selected according to a combination of the first determination and the second determination from among a plurality of previously generated pieces of setting information in relation to a type of space.

In an example embodiment, the event related to the target user may include a first event generated by a location movement of the target user or a location movement of the avatar object, a second event generated by an interaction between the target user and another user, and a third event generated by an interaction between the target user and the server.

In an example embodiment, the processor may be configured to detect the location movement of the target user in the real space, when a moved location of the target user corresponds to a first place, detect occurrence of the first event and update setting information about attributes of the first persona with setting information suitable for (e.g., corresponding to) the first place in the real space, detect the location movement of the avatar object in the virtual space, and, when a moved location of the avatar object corresponds to a second place, detect occurrence of the first event and update the setting information about the attributes of the first persona with setting information suitable for (e.g., corresponding to) the second place in the virtual space.

In an example embodiment, when another avatar object of another user exists within a preset distance from the avatar object in the virtual space and an interaction of the other user with the target user is detected, the processor may be configured to detect occurrence of the second event and update the setting information about the attributes of the first persona with setting information corresponding to the interaction of the other user.

In an example embodiment, when the interaction of the other user with the target user is detected, the processor may be configured to collect information about the other user and update the setting information about the attributes of the first persona based on at least one of intimacy information and common information between the target user and the other user.

In an example embodiment, the processor may be configured to temporarily update the setting information about the attributes of the first persona while the interaction between the target user and the other user is performed and change the setting information about the attributes of the first persona to setting information about the attributes of the first persona before the update in response to an end of the interaction.

In an example embodiment, the processor may be configured to, when information used to create the first persona is transmitted to the server and interaction of the server, which is configured (e.g., optimized) based on the transmitted information, with the target user is detected, detect occurrence of the third event and update the setting information about the attributes of the first persona with setting information corresponding to the interaction of the server.

In an example embodiment, a method (e.g., performed by a processor) may include creating a preliminary persona based on first information related to history of a target user, creating a first persona from the preliminary persona based on second information related to a time and a space of the target user, applying the first persona to an avatar object that is placed in a virtual space and corresponding to the target user, and when an occurrence of an event related to the target user is detected, creating a second persona from the first persona based on the event occurrence and applying the second persona to the avatar object corresponding to the target user instead of the first persona.

In an example embodiment, the creating of the preliminary persona may include collecting the first information including life pattern information of the target user and health information of the target user through an application installed on an electronic device and creating the preliminary persona by updating setting information about at least one attribute included in a persona based on individual pieces of information included in the collected first information.

In an example embodiment, when there is a plurality of individual pieces of information for commonly updating setting information about one attribute among individual pieces of information included in the first information, the creating of the preliminary persona may include updating the setting information about the one attribute by setting a first (e.g., higher) weight for information generated later among the plurality of individual pieces of information.

In accordance with an example embodiment, the second information may include real space-time information corresponding to the target user in a real space and virtual space-time information corresponding to the avatar object in a virtual space and the applying of the first persona may include collecting the real space-time information through an application installed on the electronic device and a global positioning system (GPS) module (including, e.g., GPS circuitry), collecting the virtual space-time information through a server constructing the virtual space, and creating the first persona by updating setting information about at least one attribute included in the preliminary persona based on individual pieces of information included in the collected second information.

In an example embodiment, the applying of the first persona may include performing a first determination on whether a space where the avatar object is located in the virtual space is indoors or outdoors, performing a second determination on whether the space where the avatar object is located in the virtual space is a private space or a public space, and updating setting information about attributes of the preliminary persona with one piece of setting information selected according to a combination of the first determination and the second determination from among a plurality of previously generated pieces of setting information in relation to a type of space.

In an example embodiment, the event related to the target user may include a first event generated by a location movement of the target user or a location movement of the avatar object, a second event generated by an interaction between the target user and another user, and a third event generated by an interaction between the target user and the server.

In an example embodiment, the applying of the second persona may include detecting the location movement of the target user in the real space, when a moved location of the target user corresponds to a first place, detecting an occurrence of the first event and updating setting information about attributes of the first persona with setting information suitable for the first place in the real space, detecting the location movement of the avatar object in the virtual space, and, when a moved location of the avatar object corresponds to a second place, detecting occurrence of the first event and updating the setting information about the attributes of the first persona with setting information suitable for (e.g., corresponding to) the second place in the virtual space.

In an example embodiment, when another avatar object of another user exists within a preset distance from the avatar object in the virtual space and an interaction of the other user with the target user is detected, the applying of the second persona may include detecting occurrence of the second event and updating the setting information about the attributes of the first persona with setting information corresponding to the interaction of the other user.

In an example embodiment, when information used to create the first persona is transmitted to the server and interaction of the server, which is configured (e.g., optimized) based on the transmitted information, with the target user is detected, the applying of the second persona may include detecting occurrence of the third event and updating the setting information about the attributes of the first persona with setting information corresponding to the interaction of the server.

The electronic device according to various embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be understood that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," may include any one of the items listed together in the corresponding one of the phrases, or all possible combinations thereof. Terms such as "first", "second", or "1st" or "2nd" may simply be used to distinguish a component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., by wire), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-predetermined integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a display;
memory configured to store computer-executable instructions; and
at least one processor comprising processing circuitry configured individually or collectively to execute the instructions by accessing the memory and to control the electronic device to:
create a preliminary persona based on first information related to history of a first user;
create a first persona from the preliminary persona based on second information related to a time and a space of the first user and apply the first persona to a first avatar object in a virtual space and corresponding to the first user; and
when occurrence of an event related to the first user is detected, create a second persona from the first persona based on the event occurrence and apply the second persona, instead of the first persona, to the first avatar object,
wherein the at least one processor is configured individually or collectively to, based on a second avatar object of a second user being within a preset distance of the first avatar object in the virtual space and detection of an interaction between the second user and the first user, control the electronic device to update setting information about attributes of the first persona with setting information corresponding to the interaction of the second user.

2. The electronic device of claim 1, wherein at least one processor comprising processing circuitry is configured individually or collectively to:
collect the first information comprising life pattern information of the first user and health information of the first user through an application installed on the electronic device; and
create the preliminary persona by updating setting information about at least one attribute of the preliminary persona based on individual pieces of information included in the collected first information.

3. The electronic device of claim 2, wherein at least one processor comprising circuitry is configured individually or collectively, when individual pieces of the first information include a plurality of individual pieces of information for commonly updating setting information about one attribute, to update the setting information about the one attribute by setting a higher weight for information generated at a later time among the plurality of individual pieces of information.

4. The electronic device of claim 1, wherein the second information comprises real space-time information corresponding to the first user in a real space and virtual space-time information corresponding to the first avatar object in the virtual space, and
at least one processor comprising processing circuitry is configured individually or collectively to:
collect the real space-time information through an application installed on the electronic device and a global positioning system (GPS) module comprising a GPS circuit;
collect the virtual space-time information through a server configured to construct the virtual space; and
create the first persona by updating setting information about at least one attribute of the preliminary persona based on individual pieces of information included in the second information.

5. The electronic device of claim 1, wherein at least one processor comprising processing circuitry is configured individually or collectively to:
perform a first determination on whether a space where the first avatar object is located in the virtual space is indoors or outdoors;
perform second determination on whether the space where the first avatar object is located in the virtual space is a private space or a public space; and
update setting information about attributes of the preliminary persona with a piece of setting information selected according to a combination of the first determination and the second determination from among a plurality of previously generated pieces of setting information in relation to a type of space.

6. The electronic device of claim 1, wherein the event related to the first user comprises a first event generated by location movement of the first user or location movement of the first avatar object, a second event generated by interaction between the first user and another user, and a third event generated by interaction between the first user and a server.

7. The electronic device of claim 6, wherein at least one processor comprising processing circuitry is configured individually or collectively to:
detect location movement of the first user in a real space and, when a moved location of the first user corresponds to a first place, detect occurrence of the first event and update setting information about attributes of the first persona with setting information corresponding to the first place in the real space; and
detect location movement of the first avatar object in the virtual space and, when a moved location of the first avatar object corresponds to a second place, detect occurrence of the first event and update the setting information about the attributes of the first persona with setting information corresponding to the second place in the virtual space.

8. The electronic device of claim 1, wherein at least one processor comprising processing circuitry is configured individually or collectively to, when the interaction of the second user with the first user is detected, collect information about the second user and update the setting information about the attributes of the first persona based on at least one of intimacy information or common information between the first user and the second user.

9. The electronic device of claim 1, wherein at least one processor comprising processing circuitry is configured individually or collectively to temporarily update the setting information about the attributes of the first persona while the interaction between the first user and the second user is performed and change the setting information about the attributes of the first persona to setting information about the attributes of the first persona before the update in response to an end of the interaction.

10. The electronic device of claim 1, wherein at least one processor comprising processing circuitry is configured individually or collectively to, based on an interaction attempted using information used to create the first persona by a server, update setting information about the attributes of the first persona with the setting information corresponding to the interaction of the serve.

11. The electronic device of claim 1, wherein at least one processor comprising processing circuitry is configured individually or collectively to update setting information about attributes of the first persona based on respective weights associated with a location of the first user in real space and a location of the first avatar object in the virtual space.

12. A method performed by at least one processor comprising processing circuitry, the method comprising:

creating a preliminary persona based on first information related to history of a first user;

creating a first persona from the preliminary persona based on second information related to a time and a space of the first user and applying the first persona to a first avatar object in a virtual space and corresponding to the first user; and when an occurrence of an event related to the first user is detected, creating a second persona from the first persona based on the event occurrence and applying the second persona, instead of the first persona, to the first avatar object, wherein the method further comprises, based on a second avatar object of a second user being within a preset distance of the first avatar object in the virtual space and detection of an interaction between the second user and the first user, updating setting information about attributes of the first persona with setting information corresponding to the interaction of the second user.

13. The method of claim 12, further comprising:

collecting the first information comprising life pattern information of the first user and health information of the first user through an application installed on an electronic device; and creating the preliminary persona by updating setting information about at least one attribute of the preliminary persona based on individual pieces of information included in the collected first information.

14. The method of claim 12, further comprising, when individual pieces of the first information include a plurality of individual pieces of information for commonly updating setting information about one attribute, updating the setting information about the one attribute by setting a higher weight for information generated at a later time among the plurality of individual pieces of information.

15. The method of claim 12, wherein the second information comprises real space-time information corresponding to the first user in a real space and virtual space-time information corresponding to the first avatar object in the virtual space, and the method further comprises:

collecting the real space-time information through an application installed on an electronic device and a global positioning system (GPS) module comprising a GPS circuit;

collecting the virtual space-time information through a server configured to construct the virtual space; and

creating the first persona by updating setting information about at least one attribute of the preliminary persona based on individual pieces of information included in the second information.

16. The method of claim 12, further comprising:

performing a first determination on whether a space where the first avatar object is located in the virtual space is indoors or outdoors;

performing a second determination on whether the space where the first avatar object is located in the virtual space is a private space or a public space; and updating setting information about attributes of the preliminary persona with a piece of setting information selected according to a combination of the first determination and the second determination from among a plurality of previously generated pieces of setting information in relation to a type of space.

17. The method of claim 12, wherein the event related to the first user comprises a first event generated by location movement of the first user or a location movement of the first avatar object, a second event generated by interaction between the first user and another user, and a third event generated by interaction between the first user and a server.

18. The method of claim 17, further comprising:

detecting location movement of the first user in a real space and, when a moved location of the first user corresponds to a first place, detecting occurrence of the first event, and updating setting information about attributes of the first persona with setting information corresponding to the first place in the real space; and detecting location movement of the first avatar object in the virtual space and, when a moved location of the first avatar object corresponds to a second place, detecting the occurrence of the first event and updating the setting information about the attributes of the first persona with setting information corresponding to the second place in the virtual space.

19. The method of claim 12, further comprising, based on an interaction attempted using information used to create the first persona by a server, updating setting information about the attributes of the first persona with the setting information corresponding to the interaction of the server.

20. A non-transitory computer-readable storage medium storing instructions which, when executed by at least one processor comprising processing circuitry of an electronic device, cause the electronic device to:

create a preliminary persona based on first information related to history of a first user;

create a first persona from the preliminary persona based on second information related to a time and a space of the first user and applying the first persona to a first avatar object in a virtual space and corresponding to the first user; and when an occurrence of an event related to the first user is detected, create a second persona from the first persona based on the event occurrence and applying the second persona, instead of the first persona, to the first avatar object, wherein the instructions cause the electronic device to, based on a second avatar object of a second user being within a preset distance of the first avatar object in the virtual space and detection of an interaction between the second user and the first user, updating setting information about attributes of the first persona with setting information corresponding to the interaction of the second user.

* * * * *